United States Patent
Shimizu et al.

(10) Patent No.: US 8,024,583 B2
(45) Date of Patent: Sep. 20, 2011

(54) CONFIDENTIAL INFORMATION PROCESSING HOST DEVICE AND CONFIDENTIAL INFORMATION PROCESSING METHOD

(75) Inventors: Kazuya Shimizu, Osaka (JP); Tomoya Sato, Nara (JP); Makoto Fujiwara, Kyoto (JP); Kentaro Shiomi, Kyoto (JP)

(73) Assignee: PANASONIC Corporation, Osaka (JP)

( * ) Notice: Subject to any disclaimer, the term of this patent is extended or adjusted under 35 U.S.C. 154(b) by 991 days.

(21) Appl. No.: 11/912,422

(22) PCT Filed: Apr. 25, 2006

(86) PCT No.: PCT/JP2006/308626
§ 371 (c)(1),
(2), (4) Date: Oct. 24, 2007

(87) PCT Pub. No.: WO2006/118101
PCT Pub. Date: Nov. 9, 2006

(65) Prior Publication Data
US 2009/0083547 A1    Mar. 26, 2009

(30) Foreign Application Priority Data
Apr. 27, 2005 (JP) .................. 2005-129308

(51) Int. Cl.
*G06F 11/30* (2006.01)
*H04L 9/00* (2006.01)
(52) U.S. Cl. ........................... 713/193; 380/277
(58) Field of Classification Search .................. 713/193; 380/277
See application file for complete search history.

(56) References Cited

U.S. PATENT DOCUMENTS

| | | | |
|---|---|---|---|
| 5,805,706 A | 9/1998 | Davis | |
| 7,137,012 B1 | 11/2006 | Kamibayashi et al. | |
| 7,167,559 B2* | 1/2007 | Ono et al. | 380/28 |
| 7,386,130 B2* | 6/2008 | Ito et al. | 380/263 |
| 2001/0021255 A1 | 9/2001 | Ishibashi | |
| 2002/0034302 A1* | 3/2002 | Moriai et al. | 380/270 |
| 2002/0184492 A1* | 12/2002 | Hori et al. | 713/158 |
| 2004/0059928 A1 | 3/2004 | Fujiwara et al. | |
| 2004/0111614 A1* | 6/2004 | Yamada | 713/168 |
| 2004/0172542 A1 | 9/2004 | Minemura | |
| 2005/0190923 A1* | 9/2005 | Noh et al. | 380/278 |

(Continued)

FOREIGN PATENT DOCUMENTS
EP    1067447    1/2001
(Continued)

OTHER PUBLICATIONS

English language Abstract of JP 2001-256113.
(Continued)

*Primary Examiner* — Techane Gergiso
(74) *Attorney, Agent, or Firm* — Greenblum & Bernstein, P.L.C.

(57) ABSTRACT

In the case where a target device stores: m keys {Ka1, . . . , Kam} (m is a natural number) in a manner that the Kai (i is a natural number satisfying 1≦i≦m) is encrypted with the Ka (i−1); and n keys {Kb1, . . . , Kbn} (n is a natural number) in a manner that the Kbj (j is a natural number satisfying 1≦j≦n) is encrypted with the Kb (j−1), a confidential information processing unit is caused to perform a processing of re-encrypting the encrypted key Enc (Kai, Ka (i−1)), which has been encrypted with the Ka (i−1), by using the Kb (j−1) and outputting as an encrypted key Enc (Kai, Kb (j−1)).

20 Claims, 13 Drawing Sheets

U.S. PATENT DOCUMENTS

| | | | |
|---|---|---|---|
| 2006/0165233 A1* | 7/2006 | Nonaka et al. | 380/44 |
| 2007/0015589 A1 | 1/2007 | Shimizu et al. | |

FOREIGN PATENT DOCUMENTS

| | | |
|---|---|---|
| EP | 1396778 | 3/2004 |
| EP | 1457936 | 9/2004 |
| JP | 9-016477 | 1/1997 |
| JP | 11-095660 | 4/1999 |
| JP | 2000-508854 | 7/2000 |
| JP | 2000-357126 | 12/2000 |
| JP | 2001-256113 | 9/2001 |
| JP | 2004-096666 | 3/2004 |
| JP | 2004-265026 | 9/2004 |
| WO | 97/39552 | 10/1997 |

OTHER PUBLICATIONS

English language Abstract of JP 2004-265026.
English language Abstract of JP 9-016477.
English language Abstract of JP 2004-096666.
English language Abstract of JP 11-095660.
English language Abstract of JP 2000-357126.

* cited by examiner

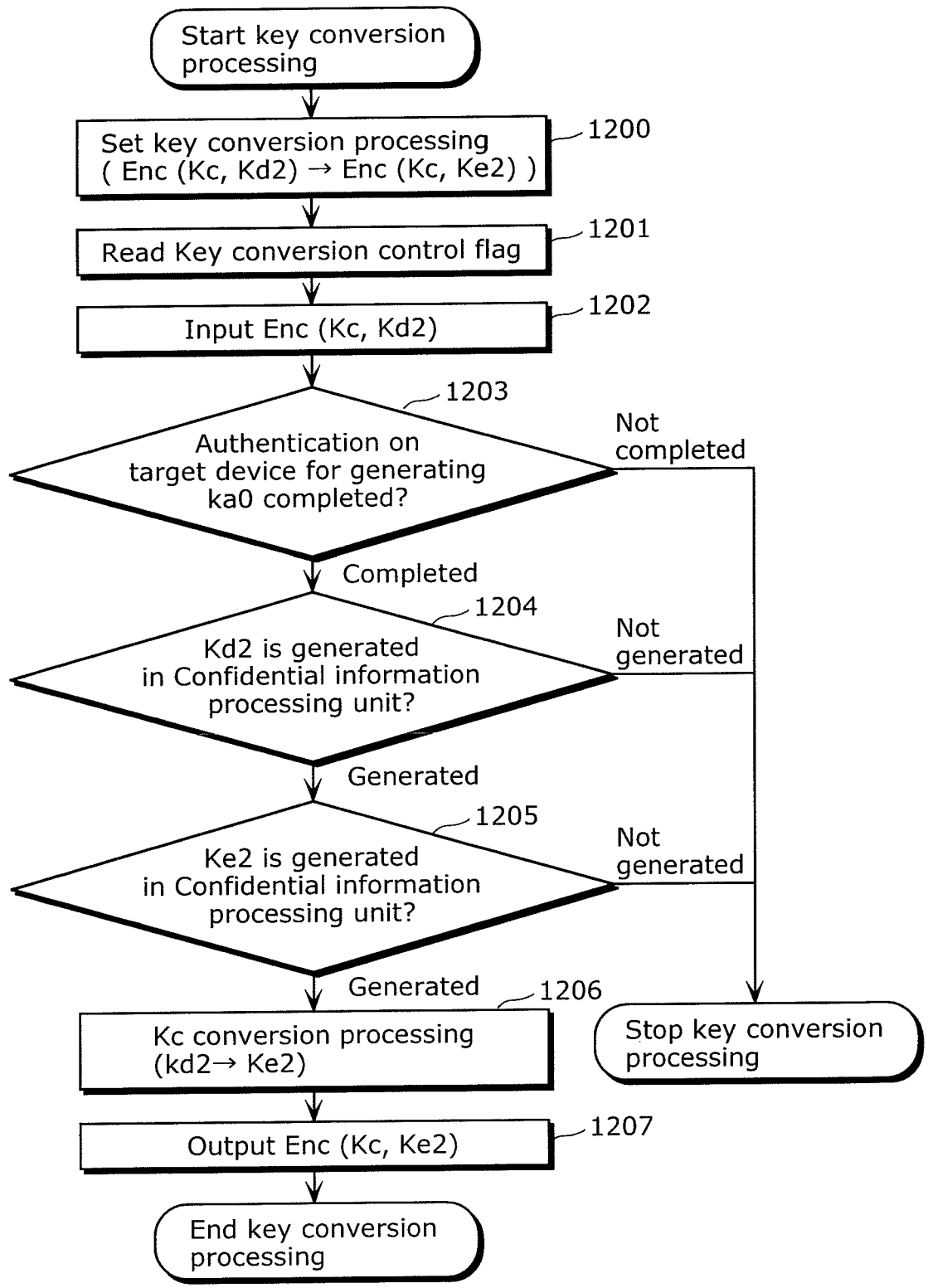

CONFIDENTIAL INFORMATION PROCESSING HOST DEVICE AND CONFIDENTIAL INFORMATION PROCESSING METHOD

TECHNICAL FIELD

The present invention relates to a method for processing encryption conversion on a key which is stored in a target device and, to a host device which serves as a confidential information processing device for achieving the method.

BACKGROUND ART

In recent years, devices for storing data (hereinafter referred to as a "target device"), such as memory cards, have been widely used with expanding applications. The target devices are used by a device which usually includes a slot to which the target device is inserted and stores data into the inserted target device (hereinafter referred to as a "host device").

As one application, target devices handle data for which a copyright protection is required, such as audio data. In such an application, a confidential information processing method is used for the purpose of protecting a copy right of, for example, audio data. In the confidential information processing method, data which require a copyright protection is encrypted and the encrypted data is stored in the target device. This processing prevents an unauthorized copying of content such as copyrighted works or a leakage of content to outside.

A method for processing confidential information in order to protect copyright as mentioned above will be described below. In the confidential information processing method for protecting copyright, first of all, an authentication processing is carried out between the target device and the host device. Next, only when the authentication succeeded, the host device is allowed to obtain, from the target device, a content key (hereinafter referred to as "Kc") which is a key for decrypting encrypted content. By obtaining the content key, the host device is allowed to use the encrypted content which is stored in the target device. With this structure, encrypted content is prevented from being decrypted by an unauthorized host device. A related art of such confidential information processing method for protecting copyright includes patent reference 1.

Next, a processing, in which the host device decrypts content using the Kc in the case where the authentication is succeeded, will be described with reference to the drawings. FIG. 1 is a functional block diagram showing a structure of main parts of the host device which executes the confidential information processing method as mentioned above. Here, in FIG. 1, it is assumed that the authentication processing is properly completed and both the target device and the host device are confirmed to be authenticated devices.

In FIG. 1, a case is described in which the target device 1301 is inserted into the host device 1300, and an encrypted content 1304, stored in a work area 1303 which is an area for work, is decrypted by a confidential information processing unit 1302, provided in the host device 1300, for carrying out encryption and decryption of confidential information, such as keys, in order to use content 1305. It is noted that the confidential information processing unit described herein is mounted, as hardware, in a semiconductor integrated circuit for enhancing security.

In FIG. 1, an authentication key Ka0 (1307) which is a key generated by an authentication processing 1306 is generated in order to explain the case where the authentication of the target device 1301 succeeded, as described above. Here, the authentication key is a key which is generated in the confidential information processing unit 1302 only when the authentication succeeded, and is calculated, in the authentication processing, based on an authentication host key which is a key which the host device includes for authentication and an authentication slave key which is a key which the target device includes for authentication.

Also, a content key which is stored in the target device 1301 is obtained from the target device 1301 when decrypting content. Note that the Kc is encrypted, for ensuring confidentiality, by the ka0 which is an authentication key and stored in the target device 1301. That means that only the host device which generated the ka0 by the authentication processing is allowed to decrypt the encrypted Kc. Note that an encrypted key which is generated by encrypting kc with ka0 is indicated as Enc (Kc, ka0) hereafter (other encrypted keys are indicated in the same manner). Encrypted content which is encrypted with the Kc is stored in the target device 1301. That means that the host device which generated the Kc can decrypt the encrypted content by acquiring the encrypted content from a target device 1301.

A description will be given of a processing to be performed after the host device 1300 obtains the Enc (Kc, ka0) 1308 stored in the target device and stores it in the work area 1303, after the authentication processing. It is assumed here that the encrypted content 1304 is also obtained from the target device 1301 after the authentication processing and is stored in the work area 1303. Note that the Enc (Kc, Ka0) and the encrypted content do not necessarily have to be stored temporarily in the work area 1303, but they may be inputted into the confidential information processing unit 1302 directly from the target device 1301.

In decrypting content, the host device 1300 first inputs the Enc (Kc, Ka0) 1308 into the confidential information processing unit 1302 and then performs a decryption processing 1309 using the ka0 (1307) which is generated by the authentication processing 1306. By doing this, a Kc 1310 which is a content key in a plain text form (referring to a non-encrypted form) is generated. Note that the generated Kc 1310 is kept in the confidential information processing unit 1302, and the host device 1300 is not allowed to obtain the value. Next, the host device 1300 inputs the encrypted content 1304 and performs a decryption processing 1311 using the Kc in the confidential information processing unit 1302. This allows the host device 1300 to obtain a decrypted content 1305 and the decryption processing for the content is completed. As described above, when decrypting content, the Kc is inputted into the confidential information processing unit as the Enc (Kc, Ka0) which is in an encrypted form, and the KC which is not encrypted yet is stored in the confidential information processing unit. Consequently, the host device can decrypt content ensuring the confidentiality of the Kc.

Patent Reference 1: Japanese Unexamined Patent Application Publication No. 2000-357126

DISCLOSURE OF INVENTION

Problems that Invention is to Solve

In recent years, with the expansion of applications of target devices, there are an increasing number of target devices which concurrently implements plural methods for processing confidential information. Under the circumstances, it is desirable that the content key Kc for encrypting content may be used mutually between different confidential information processing methods. When the content Key Kc is used mutually, however, confidentiality of the Kc should be ensured. In other words, it is necessary to prevent an unencrypted content key KC from being known by a third party such as a user. It is also necessary to prevent unauthorized mutual use of the content key Kc by the third party. It can be given as an example of unauthorized mutual use that mutual use of the content key Kc is allowed between different target devices when it is allowed only within the same target devices.

In the confidential information processing method as shown in FIG. 1, an Enc (Kc, Ka0) which is encrypted with the authentication key ka0 is stored in the target device. In this confidential information processing method, a two-step decryption is required in order to decrypt the encrypted content to obtain a plaintext content. Specifically, the two-step decryption includes: decrypting the encrypted content key ENC (Kc, Ka0) by the authentication key Ka0 to obtain the content key Kc; and decrypting the encrypted content by the content key Kc.

Compared with this, confidential information processing methods which include more than two-step decryption may be considered. In a three-step confidential information processing method, for example, an Enc (Ka1, Ka0) which is obtained by encrypting a key ka1 using the authentication key ka0 is stored in the target device. Then an Enc (Kc, Ka1) which is obtained by encrypting the Kc by the Ka1 is stored in the target device. By doing this, the content can be protected as well. In this case, it is possible to decrypt the Enc (Ka1, Ka0) by generating, in the confidential information processing unit, the authentication key Ka0 by an authentication processing with the target device. Further, the Enc (Kc, Ka1) may be decrypted with the decrypted ka1.

Similarly, it is conceivable that, when generalizing a multi-step confidential information processing method, m encrypted keys [an Enc (Ka1, Ka0), . . . , an Enc (Kam−1), Ka (m−1)] are stored in the target device and a Kam is used as the encrypted key for the content key. It is desired that the content key Kc in the two-step confidential information processing method can be mutually used between different confidential information processing methods, and similarly, it is also desired that all or part of keys Kai (i is a natural number satisfying $1 \leq i \leq m$) can be mutually used between different confidential information processing methods.

Therefore, an object of the present invention is to provide a processing method for using the keys Kai mutually between different confidential information processing methods, in the case where m encrypted keys [an Enc (Ka1, Ka0), . . . , an Enc (Kam, Ka (m−1)] are stored in the target device.

Another object of the present invention is to make it possible to perform the processing method under the conditions that the confidentiality of the Kai is secured and the Kai is protected from unauthorized mutual use by a third party.

Means to Solve the Problems

In order to solve the above-mentioned problem, the host device for processing confidential information of the present invention is structured as follows. The host device reads an encrypted content from a target device storing encrypted confidential information that includes the encrypted content, and decrypts the encrypted content for use. The host device includes: a confidential information processing unit which performs operations according only to plural predetermined sequences; a CPU which directs the confidential information processing unit to initiate the sequences; the first interface which inputs and outputs data including the confidential information between the confidential information processing unit and the target device; and the second interface which inputs and outputs data including the confidential information between the confidential information processing unit and the CPU. In the target device or the host device, m keys {K1, . . . , Km} are stored as the encrypted confidential information. The key Km is a content key for encrypting a content. A key Ki is encrypted with a key K (i−1), where i is a natural number satisfying $1 \leq i \leq m$. The sequences include a key conversion sequence which converts a Ki encrypted with a K (i−1) into a Ki encrypted with a key different from the K (i−1), where the to-be-converted Ki is a key among the m keys. The first interface and the second interface output only the encrypted confidential information outside the confidential information processing unit, in the case where the key conversion sequence is initiated.

This structure makes it possible to use content mutually between different methods for processing confidential information in a manner that security of the content is secured. This is because a key conversion is not performed arbitrarily by the CPU using the confidential information processing unit, but, in the key conversion processing, operations are performed with an instruction by the CPU to initiate predetermined key conversion sequences, and because confidential information which is generated during key conversion sequences is not outputted outside the key conversion processing unit.

Further, the host device may perform the first authentication processing for the target device, and a key K0 for encrypting the key K1 may be an authentication key Ka0 generated by the first authentication processing. The target device or a different target device may store n keys {Kb1, . . . , Kbn}, where n is a natural number. The key Kbj is encrypted with a Kb (j−1), where j is a natural number satisfying $1 \leq j \leq n$. The host device may further perform the second authentication processing for the target device or the different target device. The key Kb0 may be an authentication key generated by the second authentication processing. The different key may be a key among the keys {Kb0, . . . , Kb (n−1)}.

Further, the different key may be Kb (n−m+1). This structure is more preferable since the content key can be decrypted without changing the number of times (the number of stages) of decryption from the authentication key Kb0.

The host device may perform the first authentication processing for the target device. The Key K0 for encrypting the key K1 may be an authentication key Ka0 generated by the first authentication processing. The different key may be a host key Kh which is stored in the confidential information processing unit.

This structure is useful for making a backup of key information which is stored in the target device. Since the backed-up key information is stored in a manner that it is encrypted by the host key Kh, only the host device which has the host key kh, in other words, which has performed the backup can decrypt the backed-up key.

The Key K0 may be a host key Kh stored in the confidential information processing unit. The host device may further perform the second authentication processing for the target device or a different target device. The target device may store n keys {Kb1, . . . , Kbn}, where n is a natural number. The key Kbj may be encrypted with the key Kb (j−1), where j is a natural number satisfying $1 \leq j \leq n$. The key Kb0 is an authentication key generated by the second authentication processing. In the key conversion sequence, a key K1 encrypted with the host key Kh may be converted into a K1 encrypted with a key among the keys {Kb0, . . . , Kb (n−1)}.

This structure is useful for restoring, on the target device, the key information which is backed up in the host device. Since the backed-up key information is stored in a form encrypted by the host key Kh, only the host device which has the host key Kh, in other words, which has performed the backup can decrypt the backed-up key.

The host device may perform the first authentication processing for the target device. The key K0 for encrypting the key K1 may be an authentication key Ka0 generated through the first authentication processing. The target device may store (m−s) keys {Ke1, . . . , Ke (m−s)}. A key Kej may be encrypted with a key Ke (j−1), where j is a natural number satisfying $1 \leq j \leq m-s$. A key Ke0 may be a key Ks which is a key among the m keys {K1, . . . , Km}, where s is a natural number satisfying $1 \leq s \leq m$. The different key may be a key among the keys {ke1, . . . , ke (m−s−1)}.

This structure makes it possible to reduce the number of encrypted keys to be stored in the target device.

The confidential information processing unit may further include a flag storage unit which stores an authentication flag indicating whether the first authentication processing has been properly completed. In the case where the authentication flag does not indicate a proper completion of the first authentication processing, an initiation of the key conversion sequence by the host CPU may be prohibited.

This structure makes it possible to prevent a key conversion sequence from being initiated by an unauthorized authentication processing, since the key conversion sequence is initiated only in the case where the first authentication processing has been properly completed.

The confidential information processing unit may further include a flag storage unit which stores an authentication flag indicating whether the second authentication processing has been properly completed. In the case where the authentication flag does not indicate a proper completion of the second authentication processing, the initiation of the key conversion sequence by the host CPU may be prohibited.

This structure makes it possible to prevent a key conversion sequence from being initiated by an unauthorized authentication processing, since the key conversion sequence is initiated only in the case where the second authentication processing has been properly completed.

The confidential information processing unit may further include a flag storage unit which stores a key generation flag indicating whether the key K (i−1) is generated inside. In the case where the key generation flag does not indicate that the key K (i−1) has been generated inside, the initiation of the key conversion sequence by the host CPU may be prohibited.

This structure makes it possible to prevent a key conversion sequence from being initiated by using an un unauthorized key, since the key conversion sequence is initiated only in the case where the key K (i−1), which encrypted the key Ki, has been generated.

The confidential information processing unit may further include a flag storage unit which stores a key generation flag indicating whether the different key has been generated inside. In the case where the key generation flag does not indicate that the different key is generated inside, the initiation of the key conversion sequence by the host CPU may be prohibited.

This structure makes it possible to prevent a key conversion sequence from being initiated by using an unauthorized key, since the key conversion sequence is initiated only in the case where a key for the conversion has been generated.

The confidential information processing unit may further include a flag storage unit which stores a target flag indicating whether the first authentication processing and the second authentication processing have been performed on the same target device. In the case where the target flag does not indicate the first authentication processing and the second authentication processing have been performed on the same target device, the initiation of the key conversion sequence by said host CPU may be prohibited.

This structure makes it possible, in the case where the key conversion is restricted only to the same target device, to ensure the restriction. Further, in the case where two slots for connecting a target device are provided, it is possible to prevent the initiation of an unauthorized key conversion sequence which is performed by connecting different target devices to different slots respectively.

EFFECTS OF THE INVENTION

When employing the processing method according to the present invention, it is possible to carry out a key conversion processing between confidential information processing methods each of which has a different authentication key. Therefore, it is possible to mutually use the Kc, and the like, between different confidential information processings. In the confidential information processing unit, it is also possible to prevent unauthorized key conversion processing from being carried out by a user, by confirming that unauthorized processing is not carried out by a user when performing the key conversion processing. Further, it is possible to ensure confidentiality of key information by storing unencrypted key within the confidential information processing unit.

It is further possible to mutually use and back up keys between devices other than the target device in a manner that unauthorized processing by a user is prevented and the confidentiality of key information is ensured.

It is also possible to organize keys by, for example, deleting unnecessary keys, in a manner that unauthorized processing by a user is prevented and the confidentiality of key information is ensured.

BRIEF DESCRIPTION OF DRAWINGS

FIG. 13 is a flowchart showing how the key conversion processing for obtaining the output Enc (Kc, Ke2) from the input Enc (Kc, Kd2) is carried out in the present invention.

NUMERICAL REFERENCES

Figure 1:
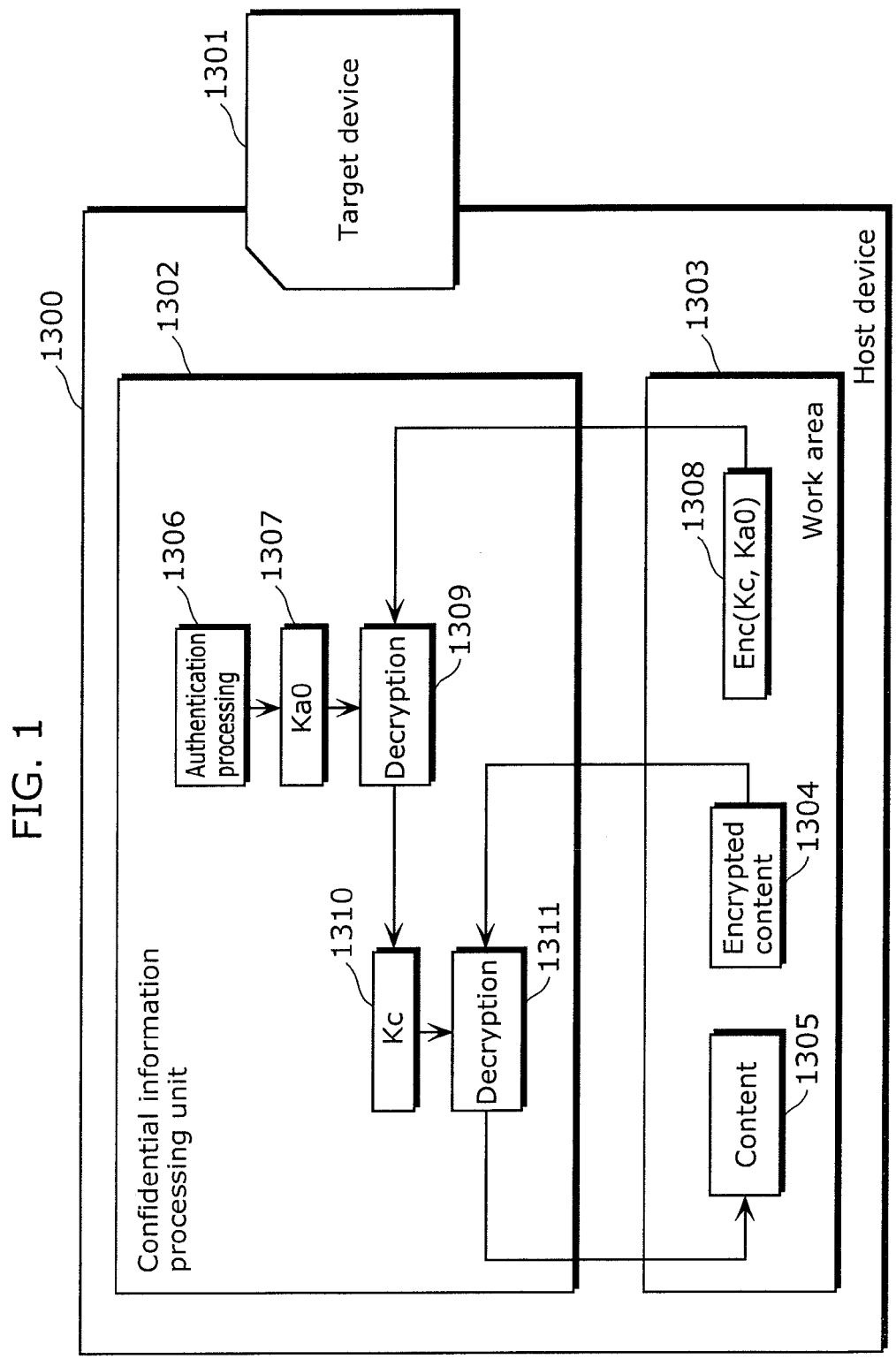
FIG. 1 is a diagram showing a content decrypting method in a conventional technique.

100 Host device
101 Target device
102 Confidential information processing unit
103 Host CPU
104 Host I/F
105 Target I/F
106 Work area
107 Internal bus
108 Semiconductor integrated circuit
216 Key conversion controller
217 Key conversion control flag
300 key-conversion-processing setting decoder circuit
301 Selector
302 AND gate
303 Authentication flag (Ka0)
304 Authentication flag (Kb0)
305 Same target flag
306 Key generation flag (Ka2)
307 Key generation flag (Kb1)
500 Target device 1
600 Target device 2
1300 Host device
1301 Target device
1302 Confidential information processing unit
1303 Work area

BEST MODE FOR CARRYING OUT THE INVENTION

Best mode for carrying out the present invention will be described below with reference to the drawings.

Embodiment 1

Figure 2:
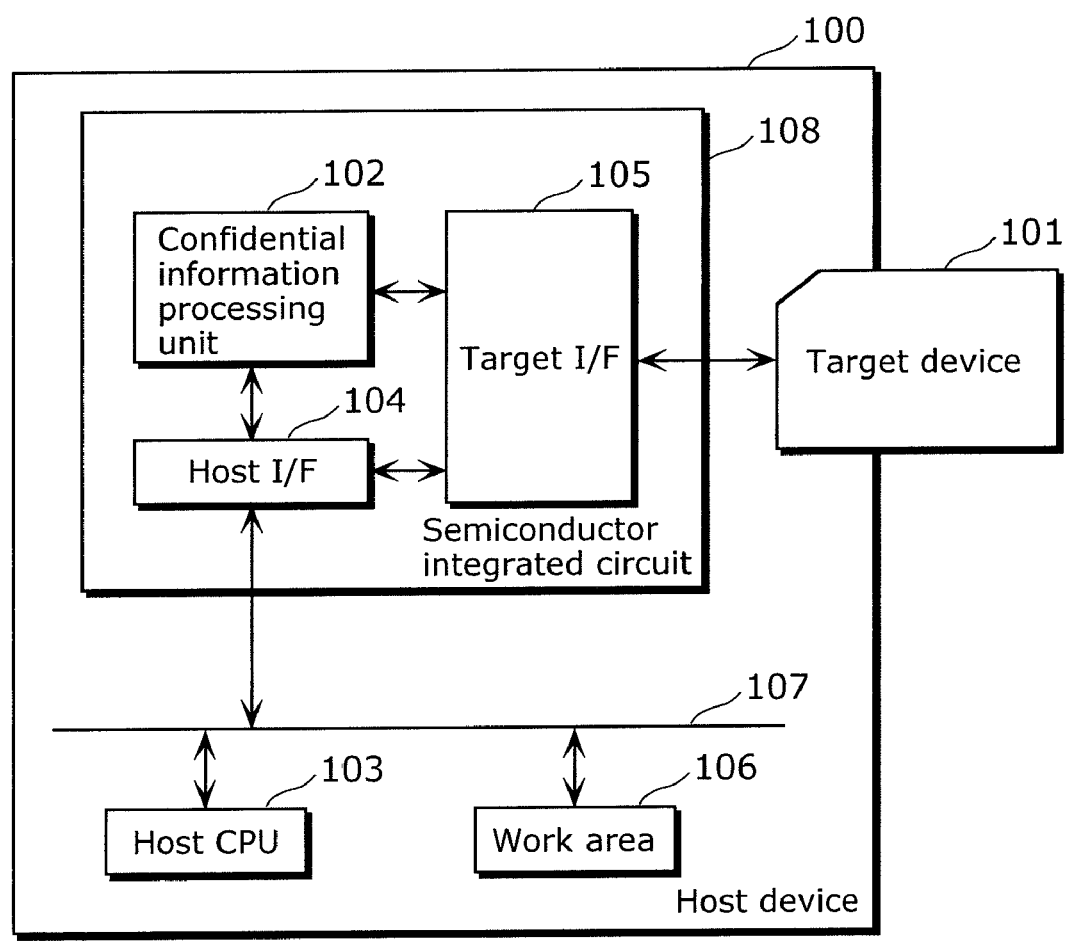
FIG. 2 is a diagram showing the overall view of a confidential information processing system in the present invention.

In the embodiment 1, a key conversion processing method in the present invention will be described. FIG. 2 shows the overall structure of the confidential information processing system which is made up of a host device 100 and a target device 101.

The host device 100 is made up of: a confidential information processing unit 102 which performs an encryption and decryption of confidential information (hereinafter indicating information, such as keys, which is not allowed to be used in a plain text without authorization) according to a predetermined control sequence; a host CPU 103 which initiates the predetermined control sequence on the confidential information processing unit 102; a host I/F 104 which inputs and outputs data between the host CPU 103, the target device 101 and the confidential information processing unit 102; a target I/F 105 which inputs and outputs data with the target device 101; a work area 106 which is an work area in which the host CPU 103 and the confidential information processing unit 102 store data temporarily for its operation, and a internal bus 107. Further, the confidential information processing unit 102, together with the host I/F 104 and the target I/F 105, is structured as a part of the semiconductor integrated circuit 108 which is secure hardware. In addition to the above-mentioned structural elements, the host CPU 103 may also be structured as a part of the semiconductor integrated circuit which is confidential hardware.

Furthermore, when confidential information including keys is read and written between the host device 100 and the target device 101, an authentication processing needs to be carried out between the host device 100 and the target device 101. Note that, the authentication processing performed here may be carried out by using either a secret key system or a public key system. When the authentication succeeds, the host device 100 reads confidential information from the target device 101 via the target I/F 105 and decodes the information for use by using the confidential information processing unit 102. Further, the operation of the confidential information processing unit 102 is initiated by the host CPU 103. When initiated, only the predetermined sequence which is secure, or which require little security, is carried out.

Here, the host I/F 104 and the target I/F 105 are structured so as not to output, outside the semiconductor integrated circuit 108, highly-confidential information (such as confidential information in a plaintext) out of intermediate information which is generated during the sequence performed by the confidential information processing unit 102.

Further, the confidential information processing unit 102 and the host CPU 103 may be composed of either same semiconductor chips or different chips.

Figure 3:
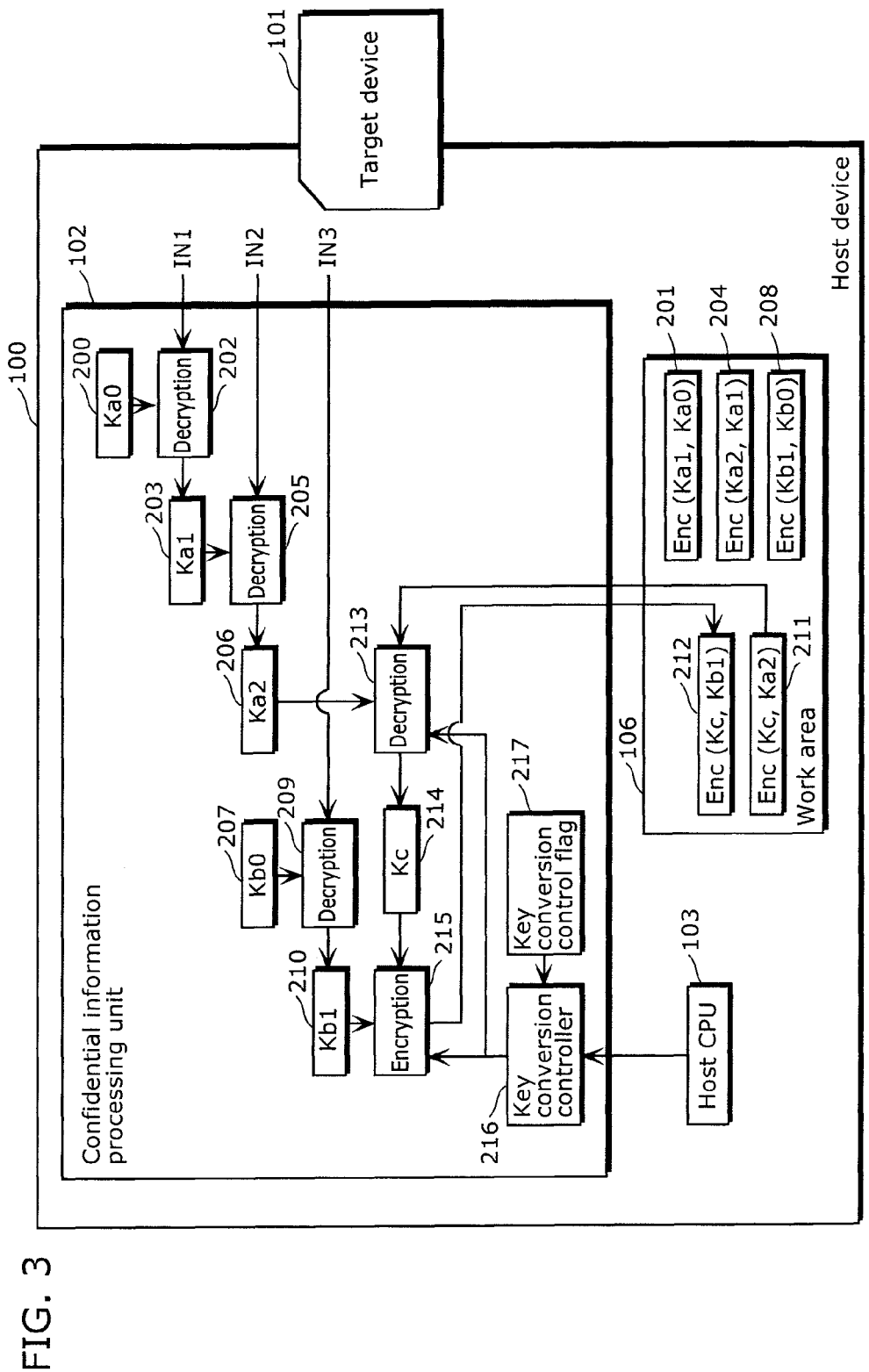
FIG. 3 is a diagram showing a structure for performing a key conversion processing by which an output Enc (Kc, Kb1) is obtained from an input Enc (Kc, Ka2) in the present invention.

FIG. 3 shows an embodiment of the key conversion processing in the present invention. For the same elements as in FIG. 2, the same numerals are applied. In FIG. 3, as an embodiment of the present invention, the following case is explained: the case where an Enc (Kc, Kb1) is obtained by performing the key conversion processing on an Enc (Kc, Ka2) in a manner where three encrypted keys {an Enc (Ka1, Ka0), an Enc (Ka2, Ka1), and an Enc (Kc, Ka2)} are stored in a target device 101 and two encrypted keys {an Enc (Kb1, Kb0) and an Enc (Kb2, Kb1)} are further stored in the same target device 101. Note that, in this drawing, the host I/F 104, the target I/F 105 and the internal bus 107 are omitted for simplification. In addition, in FIG. 3, although the decryptions 202, 205, 209 and 213 are shown as if they are different decryption circuits, this is for simplifying the description along the sequence. In many cases, in fact, the same decryption circuit is used several times along the sequence. In this case, each of the keys used for the decryption or generated as a result of the decryption needs to be stored in an area to which no access is available from outside. Further, in the case where algorithms for encryption and decryption are related to each other, it is possible to share part of, or all of the decryption and encryption circuit.

Further, it is assumed here that the authentication processing for the target device is completed and an authentication key Ka0 (200) is generated in the confidential information processing unit 102, when performing key conversion processing. It is also assumed that the Enc (Ka1, Ka0) 201 stored in the target device 101 is temporarily held in the work area 106 and then inputted into the confidential information processing unit 102 as an IN1 so that a Ka1 (203) is generated by the decryption 202 using the authentication key Ka0 (200). Further, it is assumed that the Enc (Ka2, Ka1) 204 stored in the target device 101 is temporarily held in the work area 106 and then inputted into the confidential information processing unit 102 as an IN2 so that a Ka2 (206) is generated by the decryption 205 using the authentication key Ka1 (203). Similarly, it is assumed that the authentication key Kb0 (207) is generated in the confidential information processing unit 102 by performing another authentication processing on the target device. It is assumed that the Enc (Kb1, Kb0) 208 stored in the target device 101 is temporarily held in the work area 106 and then inputted into the confidential information processing unit 102 as an IN3 so that a Kb1 (210) is generated by the decryption 209 using the authentication key Kb0 (207). Note that the Enc (Ka1, Ka0) 201, the Enc (Ka2, Ka1) 204 and the Enc (Kb1, Kb0) 208 do not necessarily need to be held temporarily in the work area 106, but they may be inputted into the confidential information processing unit 102 directly from the target device 101.

It is also assumed that the Enc (Kc, Ka2) 211 to be an input for the key conversion processing is already stored, from the target device 101, in the work area 106 of the host device 100 after the authentication processing, and the Enc (Kc, Kb1) 212 which is an output is to be stored in the work area 106. After stored in the work area, they are stored, this time, in the target device. Note that the Enc (Kc, Ka2) 211 and the Enc (Kc, Kb1) 212 do not necessarily have to be held temporarily in the work area 106, but they may be inputted into the confidential information processing unit 102 directly from the target device 101, and outputted to the target device 101 directly from the confidential information processing unit 102.

An operation of the confidential information processing unit 102 performed in the key conversion processing will be described below. In FIG. 3, it is assumed that a control sequence for performing the key conversion processing where the Enc (Kc, Ka2) is converted into the Enc (Kc, Kb1) is defined in the confidential information processing unit 102, and that this control sequence is initiated by the host CPU 103. This triggers a start of the key conversion processing.

In the key conversion processing, first, keys for encrypting and decrypting the Kc (the Ka2 (206) and the Kb1 (210) generated in the confidential information processing unit 102) are set in circuits for encryption and decryption, respectively. Then the Enc (Kc, Ka2) 211 is inputted into the confidential information processing unit 102 and the decryption processing 213 is performed on the inputted key using the Ka2 (206). As described above, an unencrypted Kc 214 is generated in the confidential information processing unit 102 by performing the decryption using the Ka2 (206). Here, in the confidential information processing unit 102, this key is stored in a manner that can not be accessed by the host CPU 103. As an example of this implementation, the Kc 214 may be stored in a register to which the host CPU 103 can not access. Note that the Kc 214 may be deleted by the confidential information processing unit 102 after the key conversion processing is completed. Next, the encryption processing 215 is performed on the Kc 214 using the Kb1 (210). By the encryption processing 215, the Enc (Kc, Kb1) 212 is outputted from the confidential information processing unit 102. By performing the above-described processings, the key conversion processing is completed.

Further, in the key conversion processing, the encryption processing 215 and the decryption processing 213 are controlled by a key conversion controller 216 and a key conversion control flag 217 shown in FIG. 3. Here, the key conversion controller 216 is a circuit for generating signals for the circuits in which the encryption processing 215 and the decryption processing 213 are respectively performed. The signals include a signal for setting a key to be used in the respective circuits and an enable signal for the respective circuits. Note that the enable signal mentioned here is a signal for enabling the encryption and the decryption to be performed during the period when this signal is inputted into the respective circuits. The key conversion control flag 217 is read by the key conversion controller 216 when the control sequence for the key conversion processing is initiated by the host CPU 103, and used as a condition for generating the enable signal.

The key conversion control flag 217 of the present invention includes three kinds of flags. The first flag is for indicating whether or not the authentication processing has been carried out on the target device for storing the encrypted key to be inputted for the key conversion processing and on the target device for storing the encrypted key to be outputted for the key conversion processing, respectively (the first flag is referred to as an "authentication flag" hereinafter). The authentication flag is used for confirming that each of the target devices is not an unauthorized device. In the example shown by FIG. 3, it is assumed that the authentication flag is set to 1 when each authentication has been carried out.

The second flag is a flag for indicating whether or not the two authentication processings have been carried out on the same target device (the second flag is referred to as a "same target flag" hereinafter). The same target flag is used for confirming that the authentication processing has been carried out on the same target device, in the case where the encrypted key to be the input and the encrypted key to be the output for the key conversion processing should be stored in the same target device. In an example shown as FIG. 3, it is assumed that the same target flag is set to 1 when the authentication has been carried out on the same target device. Note that, in an example of the ways for confirming that the target device is the same, an identification number unique to the target device is stored in the confidential information processing unit 102 at the time of each of the authentication processings and, by confirming whether or not the stored identification numbers are the same, the target devices are determined to be, or not to be the same.

The third flag is a flag for indicating whether or not keys for performing the decryption and the encryption in the key conversion processing (the Ka2 (206) and the Kb1 (210) in FIG. 3) are respectively generated in the confidential information processing unit (the third flag is referred to as a "key generation flag" hereinafter). In the example shown in FIG. 3, the key generation flag is used for confirming that the decryption and the encryption are not performed in a state where the Ka2 (206) or the Kb1 (210) are not generated, more specifically, in a state where Ka2=0 or Kb1=0. In the example shown in FIG. 3, it is assumed that the key generation flag is set to 1 when the key generation is carried out. Note that, in one way for confirming that the key is generated, the completion of each of the decryption processings (the decryption processing 202 and the decryption processing 205 in FIG. 3), which are required to generate the Ka2, is stored in the confidential information processing unit 102 and, from these results, it is confirmed that all of the necessary decryption processings are completed.

Figure 4:
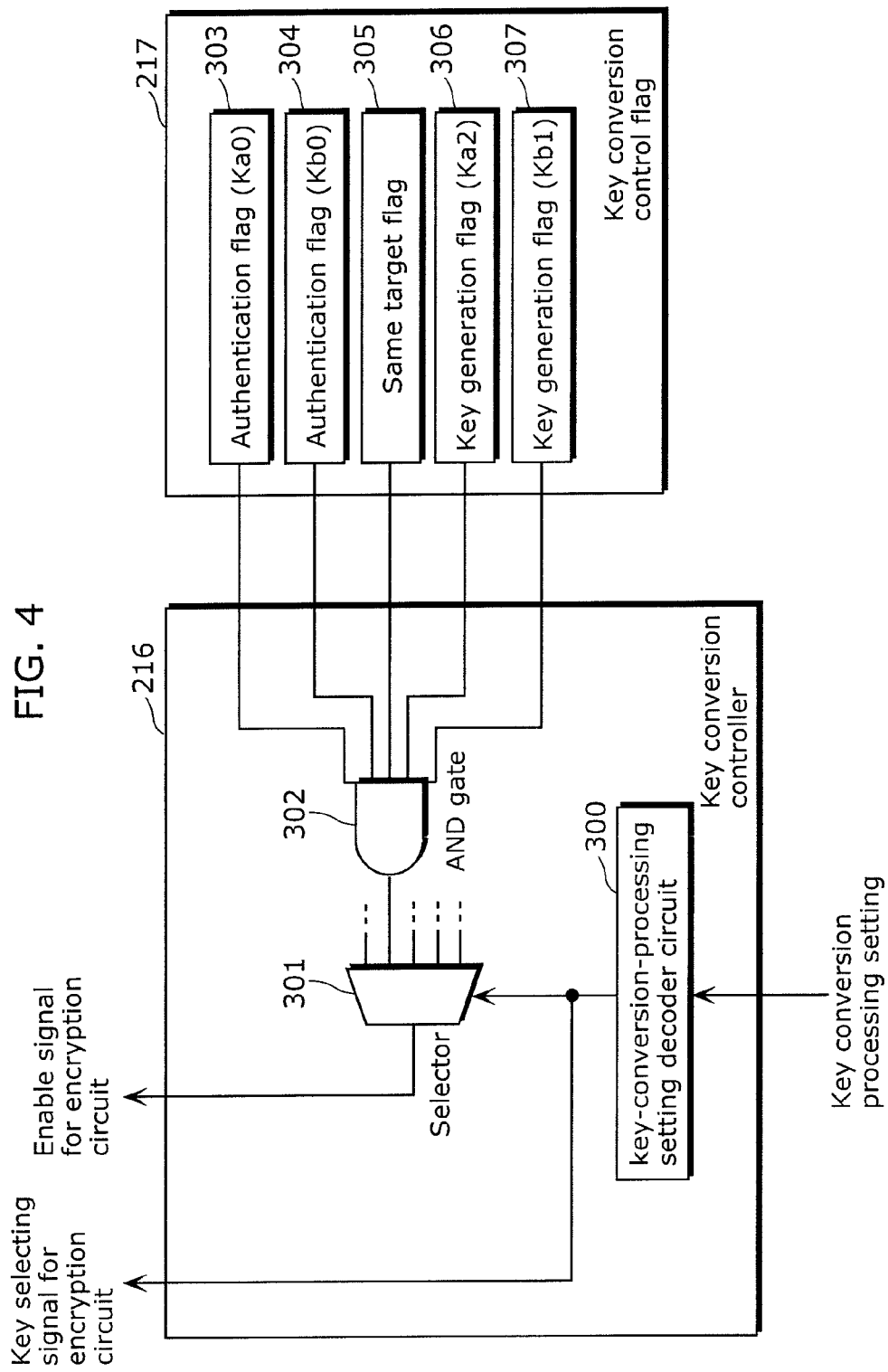
FIG. 4 is a diagram showing a structure of a key conversion controller and key conversion control flags in the present invention.

FIG. 4 shows an example of the structure of the key conversion controller 216 and the key conversion control flag 217 used in the key conversion processing of FIG. 3. The key conversion controller 216 has a key conversion processing setting, as an input from the host CPU 103, for setting which key conversion processing is to be initiated on the confidential information processing unit 102, and has a key selecting signal and the enable signal for the encryption circuit as outputs. Further, the key conversion controller 216 is composed of a key conversion setting decoder circuit 300 for decoding the key conversion processing setting, a selector 301 which selects a signal outputted from the decoder circuit as a selection signal, and an AND gate 302 which is used as an input to the selector 301. Here, the key conversion setting decoder circuit 300 is made up, for example, of a register for holding the key conversion processing setting received from the host CPU 103 and a circuit for converting the value of the resister into an internal control signal which is used in the confidential information processing unit 102. Further, flags, which are necessary for the key conversion processing initiated by the host CPU 103 to be performed with authorization, are inputted as inputs for the AND gate 302.

Here, flags which are required in the case of FIG. 3 will be described. In the processing shown in FIG. 3, the Ka2 (206) and the Kb1 (210) which are respectively generated from the authentication key Ka0 (200) and the authentication key Kb0 (207) are used Therefore, both the authentication processing for generating the authentication key Ka0 (200) and the authentication processing for generating the authentication key Kb0 (207) need to be completed. Consequently, both the authentication flag (ka0) 303 and the authentication flag (kb0) 304 need to be used and to be set to 1. It is also assumed that, in the case of FIG. 3, both the Enc (Kc, Ka2) 211 which is the input for the key conversion processing and the Enc (Kc, Kb1) 212 which is the output are stored in the same target device. Therefore, it is necessary that the same target flag 305 is used and that the value is set to 1. Note that, in the case where the key conversion processing is not performed for the same target device, the same target flag 305 is not used as a condition for generating the enable signal. Further, since both the Ka2 (206) and the Kb1 (210) are need to be generated in the confidential information processing unit 102 in the key conversion processing, both the key generation flag (Ka2) 306 and the key generation flag (Kb1) 307 need to be used and set to 1. Therefore, in the case where the key conversion processing setting for performing the key conversion processing shown in FIG. 3 is carried out by the host CPU 103, the output of the AND gate 302 which has these five flags as inputs is selected as the output of the selector 301. Consequently, only when all of the five flags are set to 1, the encryption circuit is allowed to be used. Note that it is not necessarily required to include all of the five flags. For example, some systems with only one of the authentication flag and the key generation flag makes it possible to attain a certain level of security. Further, the same target flag 305 is required in the case where a mode which allows only the key conversion in the same target exists, but it is not necessarily required when such a mode does not exist. However, in the case where two slots are provided, it is preferable to include the same target flag 305, and the reason for that will be described later in the embodiment 2.

Note that these flags may not be rewritten directly by the CPU. They are rewritten by hardware in the confidential information processing unit according to the results of each of the processings.

Next, the processing flow of the key conversion processing as shown in FIG. 3 will be described with reference to the flowchart of FIG. 5. In the key conversion processing of the present invention, first, an execution of the key-conversion-processing setting 400 is instructed by the host CPU, as indicated by the description for the FIG. 3. The key conversion processing to be executed in the confidential information processing unit 102 is initiated by this operation. Next, an execution of a key-conversion-control flag reading 401 is instructed to the key conversion controller 216. After the reading, an Enc (Kc, Ka2) input 402 to the confidential information processing unit 102 is carried out. After that, it is confirmed, based on the flags which have been read, whether or not the conditions for preventing unauthorized processings are satisfied in the confidential information processing unit 102. These processings for the confirmation correspond to the conditional branches 403 to 407 in FIG. 5. Note that, as long as it is confirmed that unauthorized processings are not to be carried out, the order of performing the confirmation does not have to be the same as the one shown in FIG. 5.

Figure 5:
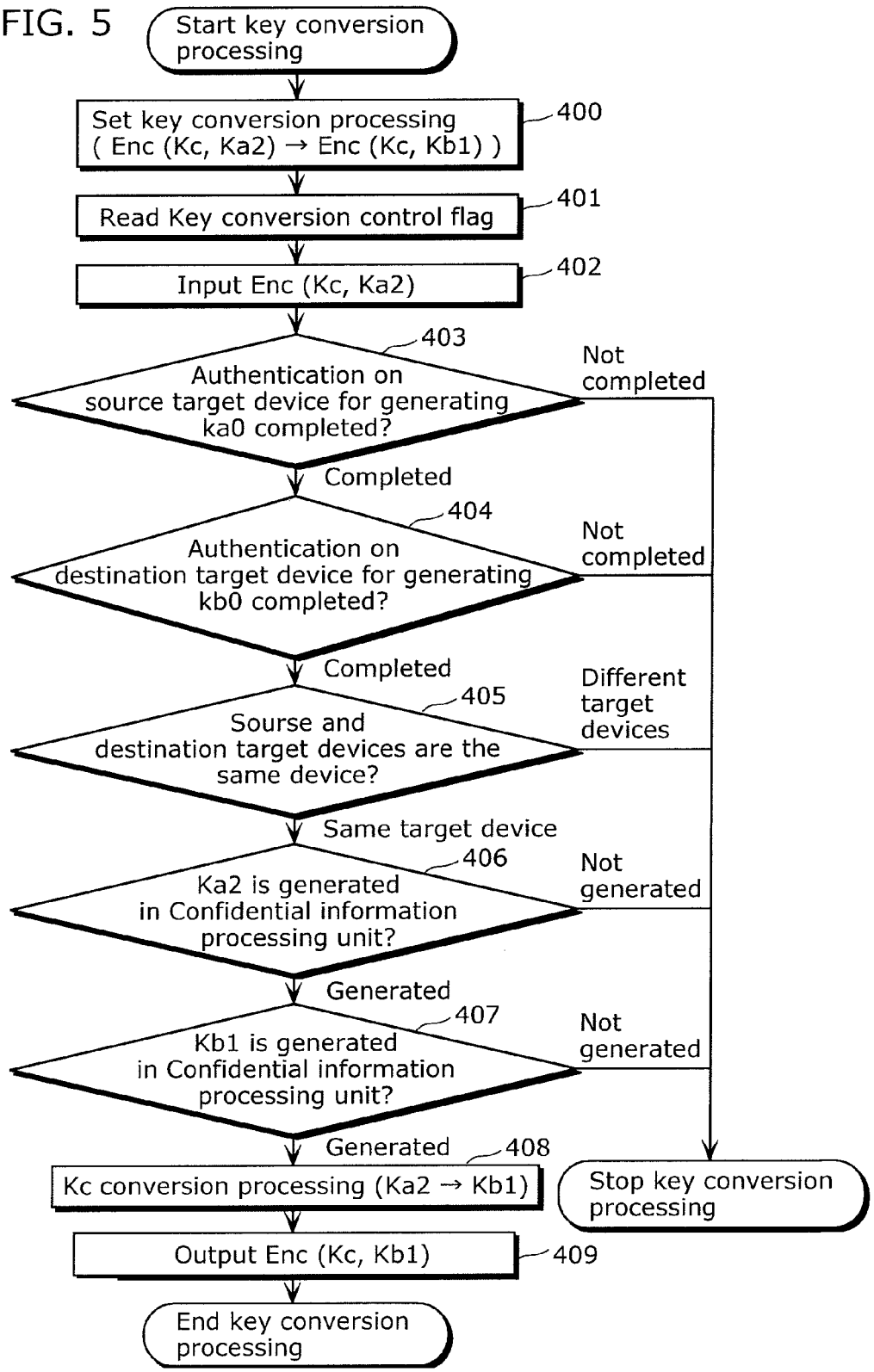
FIG. 5 is a flowchart showing how the key conversion processing for obtaining the output Enc (Kc, Kb1) from the input Enc (Kc, Ka2) is carried out in the present invention.

In FIG. 5, five kinds of confirmations are carried out as indicated in the description for the key conversion control flag in FIG. 3. First, as a condition for the authentication of the target device, it is confirmed, in the conditional branch 403, whether or not the authentication processing for generating the authentication key Ka0 (200) has been carried out on the target device which stores the Enc (Kc, Ka2) 211 as the input of the key conversion processing. By doing this, it is confirmed that the authentication processing for generating the authentication key Ka0 (200) has been performed and that the target device which stores the Enc (Kc, Ka2) 211 is not an unauthorized device. Next, it is confirmed, in the conditional branch 404, whether or not the authentication processing for generating the authentication key Kb0 (207) has been performed on the target device which stores the Enc (Kc, Kb1) 212 as the output of the key conversion processing. By doing this, it is confirmed that the authentication processing for generating the authentication key Kb0 (207) has been performed and that the target device which stores the Enc (Kc, Kb1) 212 is not an unauthorized device.

Next, as indicated in the description of the same target flag, it is confirmed, in the conditional branch 405, whether or not the two executed authentication processings have been performed on the same target device, since it is assumed in the example of FIG. 3 that the key conversion processing is carried out for the same target device. By doing this, it is confirmed whether the key conversion processing for the same target device is carried out.

Further, as indicated in the description for the key generation flag, it is confirmed, in the conditional branches 406 and 407, that the Ka2 (206) and the Kb1 (210) have been generated in the confidential information processing unit 102. By doing this, it is confirmed that the decryption and the encryption are not carried out when the Ka2 (206) and the Kb1 (210) are not generated, in other words, under the conditions that Ka2=0 and kb1=0.

By performing the above-described confirmations, it is confirmed that the key conversion processing which is set by the host CPU 103 is carried out with authorization. Therefore, after the confirmations, a conversion processing 408 (in FIG. 3, a processing of decryption by the Ka2 (206) and encryption by the Kb1 (210)) is carried out on the Enc (Kc, Ka2) as the input. During this period, the enable signal is outputted from the key conversion controller 216 to the circuits where the encryption processing 215 and the decryption processing 213 are performed. And, as a result of the conversion processing, the Enc (Kc, Kb1) output 409 is performed. After the output, the key conversion processing is completed.

As described above, through the processings of FIG. 3 and FIG. 5, the key conversion processing is carried out. Note that, in the example of FIG. 3, the description is given of the case in which the Enc (Kc, Kb1) 212 is obtained by performing the key conversion processing on the Enc (Kc, Ka2) 211 in the state that {the Enc (Ka1, Ka0), the Enc (Ka2, Ka1) and the Enc (Kc, Ka2)} are stored in the target device and {the Enc (Kb1, Kb0), the Enc (Kb2, Kb1)} are stored in the same target device. However, the present invention is not limited to this case. For example, the invention may be applied to the case where there are plural content keys encrypted with the Ka2, and all of these encrypted content keys are used in a confidential information processing method including the Kb0, as the authentication key, which is obtained by a different authentication processing. In this case, when the key which encrypts each of the content keys is converted to the Kb1, it is necessary to perform the key conversion processing as many times as the number of the content keys. Therefore, a key conversion processing where the Enc (Ka2, Ka1) is converted to the Enc (ka2, Kb0) is performed. Then, by performing the key conversion processing only once, it is possible to use all of the content keys for which the ka2 is used for encryption in a confidential information processing method where the Kb0 is the authentication key. Meanwhile, it is also possible to convert the Enc (Ka1, Ka0) to the Enc (Ka1, Kb0). However, the number of times for decrypting the Kc from the authentication key Kb0 increases compared with that of the case where the Kb1 is used. Therefore, it is more preferable to convert the Enc (Ka2, Ka1) to the Enc (ka2, Kb0) in such a case where the confidential information processing unit is structured so as to control the number of times for decryption according to the authentication key, and not to output the result obtained through decryption which has been performed arbitrary times other than the number of times of decryption which is controlled.

Accordingly, when generalizing this, it is also possible to obtain Enc (Kai, Kb (j−1)) by performing the key conversion processing on Enc (Kai, Ka (i−1)) where i and j are natural numbers satisfying $1 \leq i \leq m$ and $1 \leq j \leq n$, respectively, and by using Kam and Kbn for encrypting and decrypting content in a state where m keys {Enc (Ka1, Ka0), . . . , Enc (Kam, Ka (m−1))} (m is a natural number) are stored, and further n keys {Enc (Kb1, Kb0), . . . , Enc (Kbn, Kb (n−1))} (n is a natural number) are stored, in the target device. In this case, it is possible to perform the key conversion processing as in FIG. 3, by using Ka (i−1) in a circuit for decryption and Kb (j−1) in a circuit for encryption, instead, in the confidential information processing unit, and by using a flag indicating that Ka (i−1) is generated and a flag indicating that Kb (j−1) is generated, instead, for the key conversion processing flags. Therefore, the key generation flags corresponding to Ka (i−1) and Kb (j−1), respectively, are added in the confidential information processing unit and a circuit for the selection of these flags is added to the key conversion controller. Furthermore, it is more preferable to satisfy m−i=n−j, since the content key may be decrypted without changing the number of times of decryption from the authentication key Kb0.

Embodiment 2

Next, the embodiment 2 will be descried. An explanation of the basic overall structure is omitted since it is similar to the one in FIG. 2.

Figure 6:
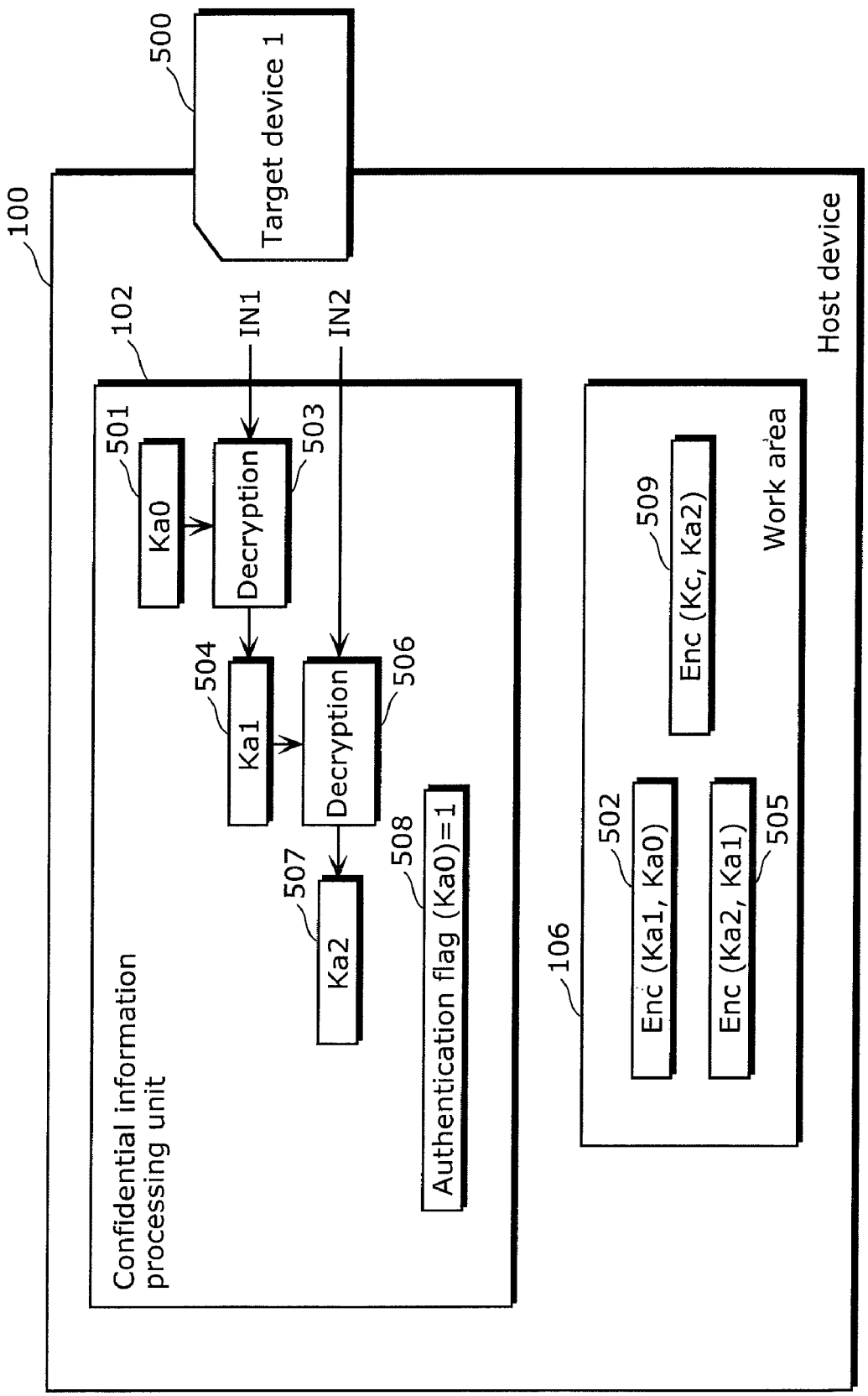
FIG. 6 is a diagram showing the structure of the confidential information processing system before the target device is replaced in deleting authentication in the present invention.
Figure 7:
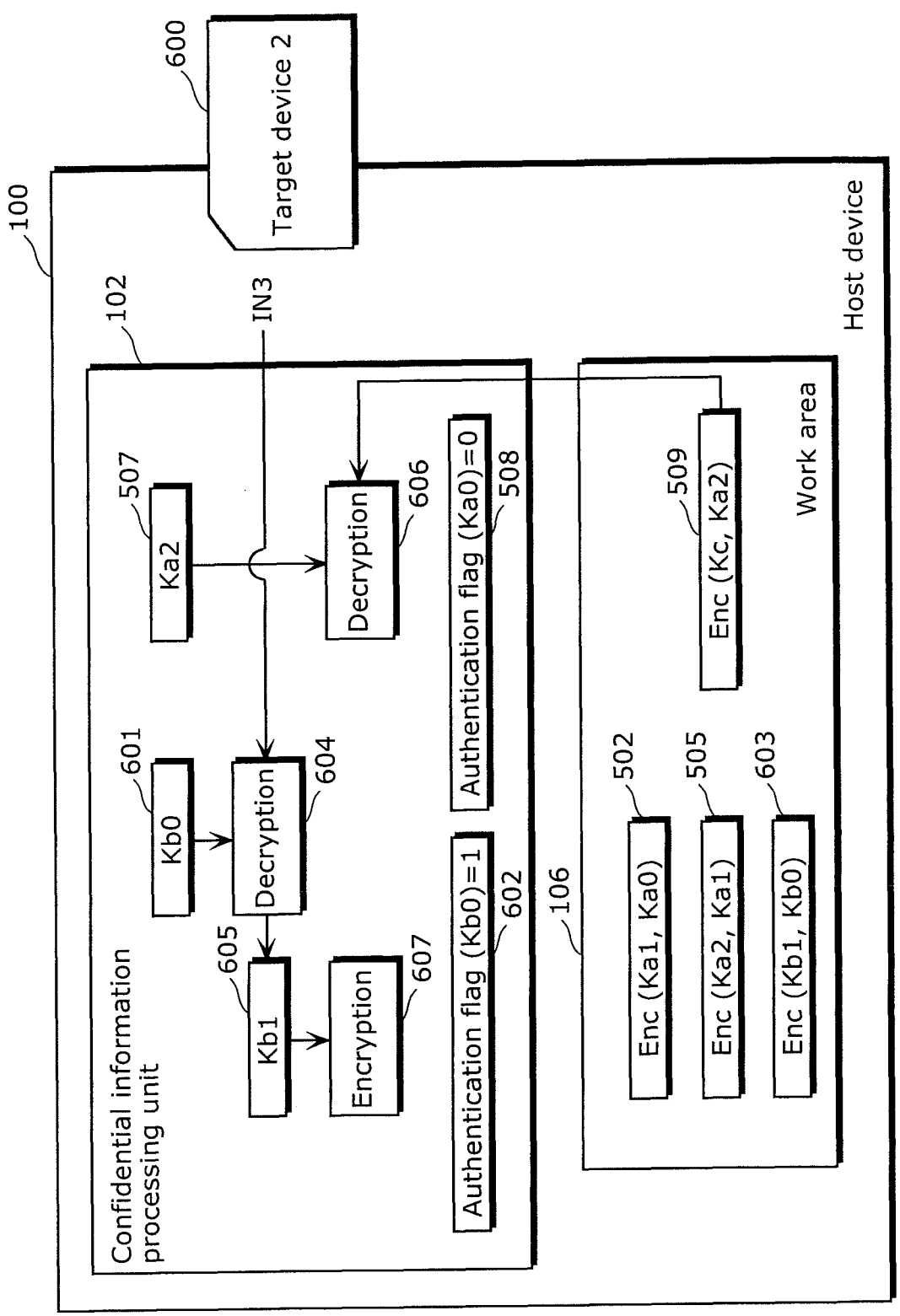
FIG. 7 is a diagram showing a structure of the confidential information processing system after the target device is replaced in deleting authentication in the present invention.

In the embodiment 2, deleting the authentication flag and the authentication key in the present invention will be described. FIG. 6 and FIG. 7 show that unauthorized processing performed by inserting and removing unauthorized target devices may be prevented by deleting the authentication flag which generates the authentication key Ka0 and deleting the authentication key ka0. Note that, for the same elements as in FIG. 2, the same numerals are applied. In addition, although the decryptions 503, 506, 604 and 606 are shown as if they are different decryption circuits in FIG. 6 and FIG. 7, this is intended to simplify the description along the sequence. In many cases, in fact, the same decryption circuit is used several times along the sequence. In this case, each of the keys used for decryption or generated as a result of decryption has to be stored in an area to which no access is available from outside. Further, in the case where algorithms for encryption and decryption are related to each other, it is possible to share part of, or all of the decryption and encryption circuit.

In FIG. 6, it is assumed that a target device 1 (500) is inserted in a host device 100 and three encrypted keys {an Enc (Ka1, Ka0), an Enc (Ka2, Ka1), an Enc (Kc, Ka2)} are stored in the target device. In FIG. 7, it is assumed that the target device 1 (500) is removed from the host device 100, and instead, a target device 2 (600) is inserted in the host device 100 and an encrypted key Enc (Kb1, Kb0) is stored in the target device. Here, it is an object of this embodiment to provide a system in which security may be maintained even when a host CPU 103 attempts to execute unauthorized processing. Accordingly, it is assumed that three encrypted keys {the Enc (Ka1, Ka0), the Enc (Ka2, Ka1), the Enc (Kc, Ka2)} which are stored in the work area 106 in the host CPU 103 are not to be deleted from the work area 106. It is also assumed that, with reference to FIG. 6 and FIG. 7, the key conversion processing is performed on the Kc by using the Ka2 generated from the Ka0 and the Kb1 generated form the authentication key Kb0. As mentioned above, it will be described, in FIG. 6 and FIG. 7, how the confidential information processing unit 102 operates in the case where the target device is replaced in performing the key conversion processing. Note that it is assumed here that the key conversion processing needs to be performed on the same target device. For that reason, when the target device is inserted and removed, the insertion and removal are unauthorized processings.

First, an authentication is carried out in the state where the target device 1 (500) is inserted as shown in FIG. 6. When the target device 1 (500) is an authorized device, the authentication key Ka0 (501) is generated in the confidential information processing unit and the authentication flag (ka0) 508 stores the completion of the authentication processing for generating the authentication key Ka0 (501). Then, it is assumed that the Enc (Ka1, Ka0) 502 stored in the target device 1 is temporarily held in the work area 106 and then inputted into the confidential information processing unit 102 as an IN1 so that a Ka1 (504) is generated by the decryption 503 using the authentication key Ka0 (501). Further, it is assumed that the Enc (Ka2, Ka1) 505 stored in the target device 1 is temporarily held in the work area 106 and then inputted into the confidential information processing unit 102 as an IN2 so that a Ka2 (507) is generated by the decryption 506 using the Ka1 (504). Note that the Enc (Ka1, Ka0) 502 and the Enc (Ka2, Ka1) 505 do not necessarily need to be held temporarily in the work area 106, but they may be inputted into the confidential information processing unit 102 directly from the target device 500.

Further, it is assumed that the Enc (Kc, Ka2) 509 stored in the target device 1 (500) has been stored in the work area 106 in the host device 100. Note that the Enc (Kc, Ka2) does not necessarily have to be stored in the work area 106, but it may be inputted into the confidential information processing unit 102 directly from the target device 500.

Here, as shown in FIG. 7, it is assumed that the target device 1 (500) is removed from the host device 100 and the target device 2 (600) is inserted instead. Note that, it is assumed here that the key conversion processing is to be performed on the same target device. For that reason, this insertion and removal are unauthorized processings. In such a case, in the key conversion processing according to the present invention, the authentication for the target device and the authentication key generated in the confidential information processing unit 102 during the authentication processing are deleted as the target device is removed. In addition, in the case where keys (the Ka1 (504) and the Ka2 (507)) which are generated from the authentication key are generated in the confidential information processing unit 102, these keys may be deleted.

Here, the deletion of the authentication refers to the deletion of the authentication flag and, in the example of FIG. 7, to the processing for setting the authentication flag (ka0) 508 to 0. Also, the deletion of the authentication key refers to, for example, setting the authentication key Ka0 (501) as Ka0=0 for the target device 1 (500) in the example of FIG. 7. Further, these deletions of information include: a deletion in which the confidential information processing unit 102 detects that the target device is removed and performs the deletion; and a deletion in which the host CPU 103 detects that the target device is removed and instructs the confidential information processing unit 102 to initiate a control sequence for the deletion.

Next, in the example of FIG. 7, it is assumed that the authentication processing for generating the authentication key Kb0 (601) has been carried out on the target device 2 (600). When the target device 2 (600) is the authorized device, the authentication key Kb0 (601) is generated and the authentication flag (kb0) 602 stores that the authentication for generating the authentication key (kb0) is completed. Further, it is assumed here that the Enc (Kb1, Kb0) 603 stored in the target device 2 (600) is temporarily held in the work area 106 and then inputted into the confidential information processing unit 102 as an IN3 so that a Kb1 (605) is generated by the decryption 604 using the authentication key Kb0 (601). Note that the Enc (Kb1, Kb0) 603 does not necessarily have to be stored temporarily in the work area 106, but it may be inputted into the confidential information processing unit 102 directly from the target device 600.

It is assumed that, in this state, the key conversion processing from the Enc (Kc, Ka2) to the Enc (Kc, Kb1) is initiated by the host CPU 103, and the Enc (Kc, Ka2) 509 stored in the work area 106 is inputted. When these processings are carried out, the confidential information processing unit stores information indicating that the authentication flag (ka0) 508 is 0, in other words, the authentication processing for generating the authentication key Ka0 has not been carried out. Consequently, as an enable signal is not generated for the encryption circuit where the decryption is carried out using the Ka2 (507), it is not possible to perform the decryption processing 606 to obtain the Kc. Further, the enable signal is not generated also for the encryption circuit where the encryption processing 607 on the Kc is carried out.

However, when the completion of the authentication on the target device 1 (500) is not deleted, the authentication flag (ka0) 508 in the confidential information processing unit 102 indicates 1 even after the target device 1 (500) is removed. Then the authentication flag (kb0) 602 is set to 1 triggered by the authentication of the target device 2 (600) which has been inserted next. Here, referring to FIG. 4, the key generation flag (Ka2) 306 and the key generation flag (Kb1) 307 may also indicate 1, since the keys may exist properly by the authentication. Therefore, it remains possible for the key conversion processing to be initiated without authorization.

Furthermore, the advantages of the same target flag 305 will be described here, taking the case in which two slots are provided as an example. In this case, when the authentication of the target device 1 on the first slot is succeeded and the authentication of the target device 2 on the second slot is succeeded, the authentication flag (ka0) 508 and the authentication flag (kb0) 602 are set to 1, and keys may also be properly generated. Consequently, there is a possibility that unauthorized key conversion is carried out when the CPU initiates processing without authorization. However, such unauthorized processing is prevented by providing for the same target flag and allowing key conversions only to the same target device. Note that, as to a method of updating the same target flag, it is possible to employ a method for storing the information indicating on which slot each of the authentication processing is carried out, other than the method in which the unique identification number as described in the embodiment 1 is used. In such a method, in the case where the host device includes two slots and different target devices are inserted into the slots respectively, it is possible to determine that they are different target devices because the slots are different. It is therefore possible to prevent unauthorized processing from being initiated even in a state as mentioned above. In the case where the target device is removed and then inserted, naturally, unauthorized processing is not carried out since the authentication flag is deleted.

Consequently, in the case where the target device is removed from the host device 100, unauthorized key conversion processing may be prevented by deleting the success of the authentication on the target device or the authentication key, as shown in FIG. 6 and FIG. 7.

Embodiment 3

Next, the embodiment 3 will be described. An explanation of the basic overall structure is omitted since it is similar to the one in FIG. 2.

Figure 8:
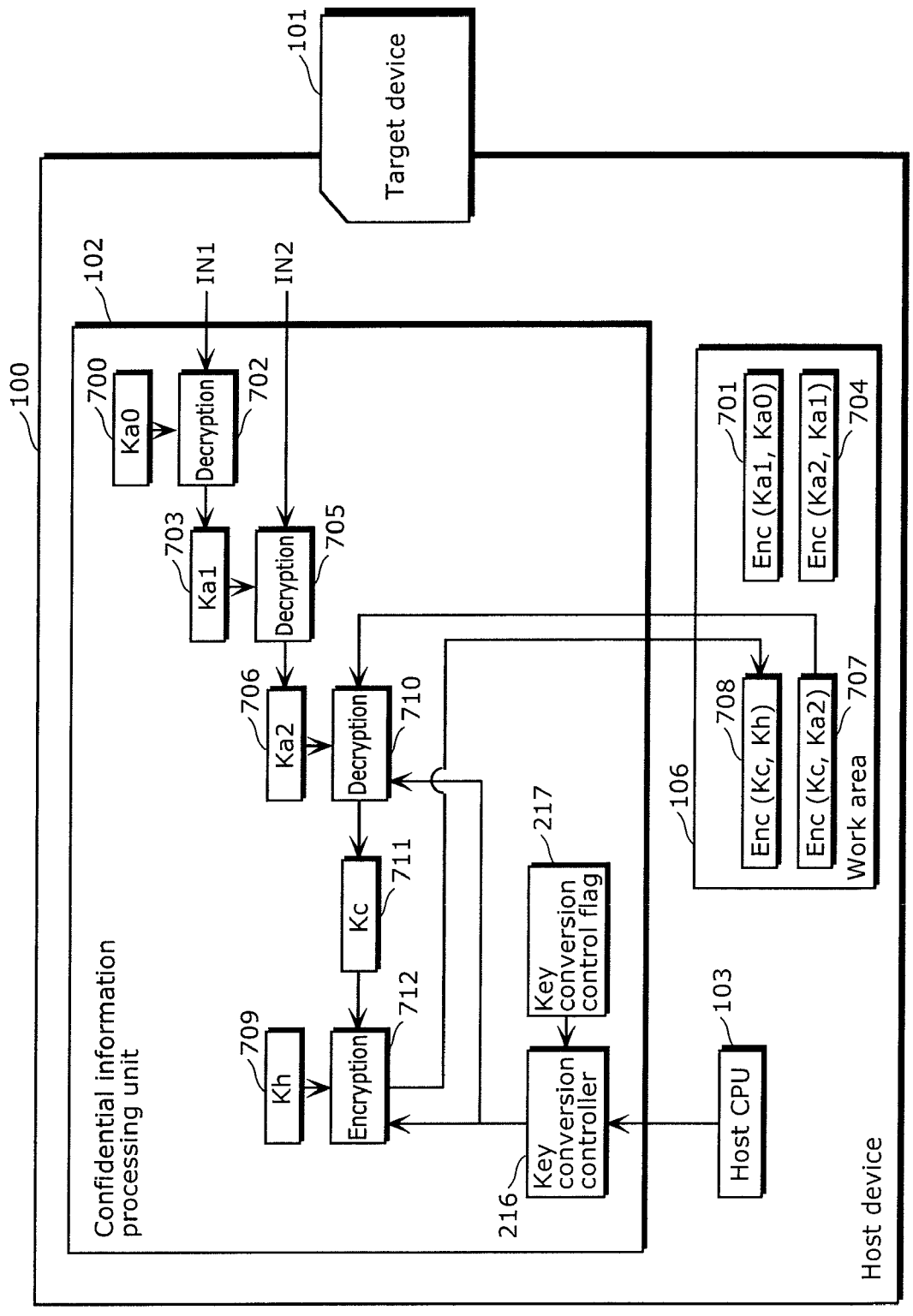
FIG. 8 is a diagram showing a structure for performing the key conversion processing by which the output Enc (Kc, Kh) is obtained from the input Enc (Kc, Ka2) in the present invention.

In the embodiment 3, a key conversion processing method in the present invention will be described. FIG. 8 shows one embodiment of the key conversion processing in the present invention. For the same elements as in FIG. 2 and FIG. 3, the same numerals are applied. In FIG. 8, as an embodiment of the present invention, the following case is explained: the case where an Enc (Kc, Kh) is obtained, with three encrypted keys {an Enc (Ka1, Ka0), an Enc (Ka2, Ka1), an Enc (Kc, Ka2)} stored in the target device 101, by performing the key conversion processing on an Enc (Kc, Ka2) using a host key Kh which is stored in the confidential information processing unit in a manner that can not be read from outside. A method for storing the host key Kh in the confidential information processing unit includes: a method for storing it into the confidential information processing unit in the time of manufacturing the semiconductor integrated circuit; and a method for inputting it into the semiconductor integrated circuit in a state that it is encrypted from outside the semiconductor integrated circuit via electronic distribution and the like, decrypting within the semiconductor integrated circuit, and storing it into the confidential information processing unit. The same applies to an embodiment 4 that will be described later. In addition, although the decryptions 702, 705, and 710 are shown as if they are different decryption circuits in FIG. 8, this is intended to simplify the description along the sequence. In many cases, in fact, the same decryption circuit is used several times along the sequence. In this case, each of the keys used for decryption or generated as a result of decryption need to be stored in an area to which no access is available from outside. Further, in the case where algorithms for encryption and decryption are related to each other, it is possible to share part of, or all of the decryption and encryption circuit.

The Enc (Kc, Kh) is not stored in the target device here, but stored, for example, in a storage device such as a hard disk within the host device. As an example of a usage of this key conversion processing, it enables a backup of the Kc stored in the target device. In such a processing, since the backed-up Kc is stored as the Enc (Kc, Kh), only the host device which has the Kh, in other words, which performed the backup may decrypt the Enc (Kc, Kh).

Further in FIG. 8, it is assumed that the authentication processing for the target device 101 is completed and a Ka0 (700) is generated in the confidential information processing unit 102. Also it is assumed that the Enc (Ka1, Ka0) 701 stored in the target device 101 is temporarily held in the work area 106 and then inputted into the confidential information processing unit 102 as an IN1 so that the Ka1 (703) is generated by the decryption 702 using the Ka0 (700). Further, it is assumed that the Enc (Ka2, Ka1) 704 stored in the target device 101 is temporarily held in the work area 106 and then inputted into the confidential information processing unit 102 as an IN2 so that a Ka2 (706) is generated by the decryption 705 using the Ka1 (703). Note that the Enc (Ka1, Ka0) 701 and the Enc (Ka2, Ka1) 704 do not necessarily need to be held temporarily in the work area 106, but they may be inputted into the confidential information processing unit 102 directly from the target device 101.

It is also assumed that the Enc (Kc, Ka2) 707 to be an input for the key conversion processing have been stored in the work area 106 of the host device 100 from the target device 101 after the authentication processing, and the Enc (Kc, Kh) 708 which is an output will be stored in the work area 106. And, after stored in the work area, it then will be stored in a storage device of the host device 100 and the like. Note that the Enc (Kc, Ka2) does not necessarily have to be stored temporarily in the work area 106, but it may be inputted into the confidential information processing unit 102 directly from the target device 101.

An operation of the confidential information processing unit 102, when the key conversion processing using the Ka2 (706) and the Kh 709 is carried out, will be described below. In FIG. 8, it is assumed that a control sequence for performing the key conversion processing where the Enc (Kc, Ka2) is converted into the Enc (Kc, Kh) is defined in the confidential information processing unit 102, and that this control sequence is initiated by the host CPU 103. This will start the key conversion processing.

In the key conversion processing, first, keys for encrypting and decrypting the Kc (the Ka2 (706) generated in the confidential information processing unit 102 and the Kh (709) stored in the confidential information processing unit (102) are set in circuits for encryption and decryption. Then the Enc (Kc, Ka2) 707 is inputted into the confidential information processing unit 102, and the decryption processing 710 is performed on the inputted key using the Ka2 (706). As described above, an unencrypted Kc 711 is generated in the confidential information processing unit 102 by the decryption using the Ka2 (706). Here, in the confidential information processing unit 102, this key is stored in a manner that can not be accessed by the host CPU 103. As an example of this storing, the Kc 711 may be stored in a register which the host CPU 103 can not access. Note that the Kc 711 may be deleted by the confidential information processing unit 102 after the key conversion processing is completed. Then an encryption processing 712 is carried out on the Kc 711 using the Kh 709. By the encryption processing 712, the Enc (Kc, Kh) 708 is outputted from the confidential information processing unit 102. By the above-described processing, the key conversion processing is completed.

Further, as in the case of the embodiment 1, the encryption processing 712 and the decryption processing 710 in key conversion processing are controlled by a key conversion controller 216 and a key conversion control flag 217 shown in FIG. 8. Here, flags which are required in the case of FIG. 8 will be explained. In the processing shown in FIG. 8, the Ka2 (706) which is generated by the authentication key Ka0 (700) is used. Therefore, it is necessary that the authentication processing for generating the authentication key Ka0 (700) is completed. For that reason, the authentication flag (ka0) is required as one of the key conversion control flag 217. Note that, in the case of FIG. 8, the same target flag is not required because the Enc (Kc, Ka2) 707 which is the input for the key conversion processing and the Enc (Kc, Kh) 708 which is the output do not have to be stored in the same target device. Further, in this key conversion processing, the Ka2 (706) needs to be generated in the confidential information processing unit 102 by the decryption processing. For that reason, the key generation flag (ka2) is required as one of the key conversion control flags 217. Note that, a generation flag for Kh 709 is not required since it is a key generated in advance in the host device 100. Therefore, in the case where the key conversion processing setting for performing the key conversion processing shown in FIG. 8 is carried out by the host CPU 103, the output of the AND gate which has inputs from two flags including the authentication flag (Ka0) and the key generation flag (Ka2) is selected as the output of the selector 301 shown in FIG. 4. Consequently, only when both of the two flags are set to 1, the encryption circuit is allowed to be used.

Next, with reference to the flowchart of FIG. 9, the processing flow of the key conversion processing shown in FIG. 8 will be described. In the key conversion processing of the present invention, as described also in the embodiment 1, first, an execution of the key-conversion-processing setting 800 is instructed by the host CPU 103. By doing this, the key conversion processing is initiated to be executed in the confidential information processing unit 102. Next, an execution of a reading of the key conversion control flag 801 is instructed to the key conversion controller 216. After the reading, an Enc (Kc, Ka2) inputting 802 is carried out on the confidential information processing unit 102. Subsequently, it is confirmed, based on the read flags, whether or not the conditions for preventing unauthorized processings are satisfied in the confidential information processing unit 102. These processings for the confirmation correspond to the conditional branches 803 to 804 in FIG. 9. Note that, when it is confirmed that unauthorized processings are not to be carried out, the order of performing the confirmation does not have to be the same as the one shown in FIG. 9.

Figure 9:
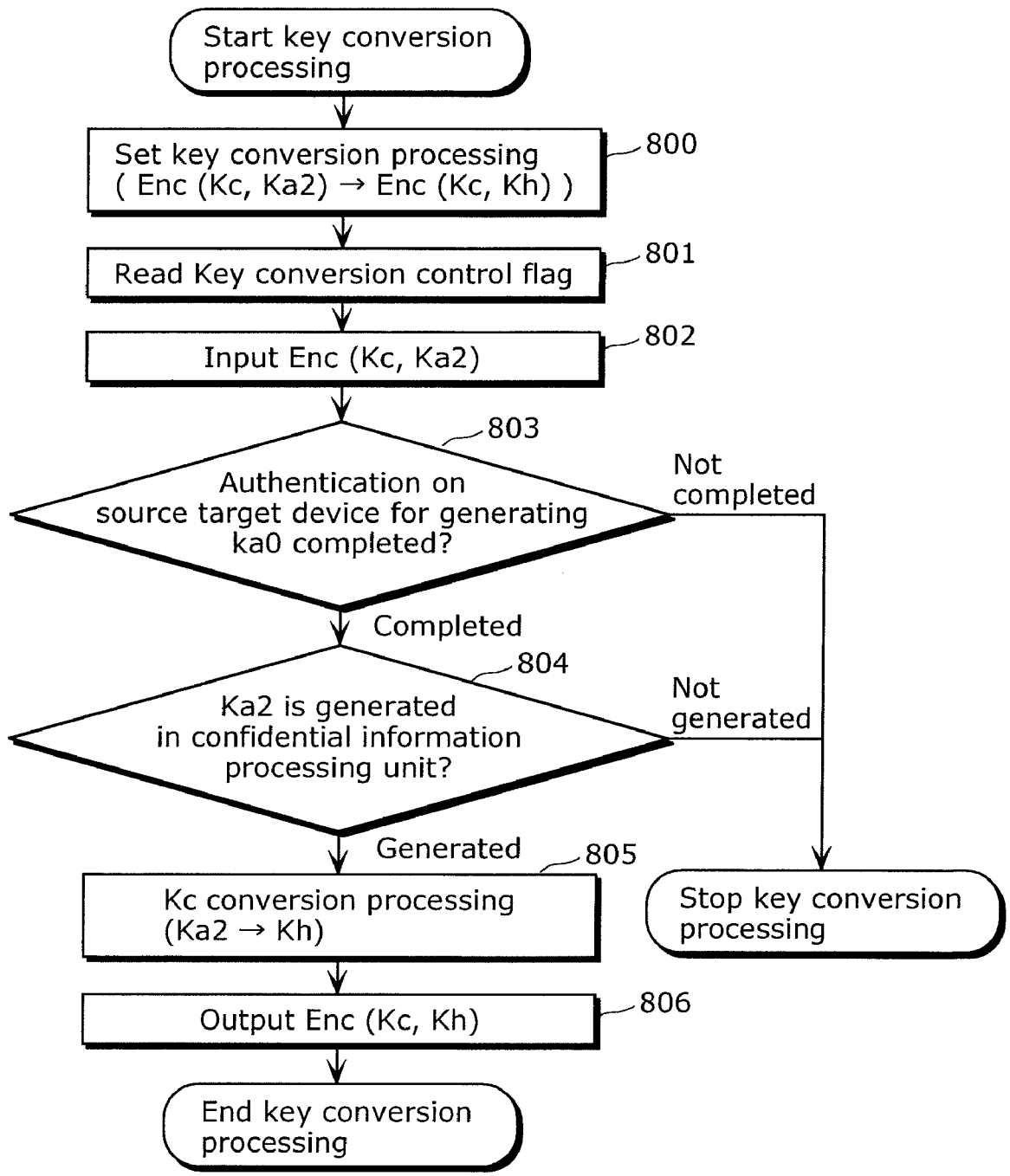
FIG. 9 is a flowchart showing how the key conversion processing for obtaining the output Enc (Kc, Kh) from the input Enc (Kc, Ka2) is carried out in the present invention.

In FIG. 9, two kinds of confirmations are carried out as indicated in the description of key conversion control flag in FIG. 8. First, as a condition for the authentication of the target device, it is confirmed, in the conditional branch 803, whether or not the authentication processing for generating the authentication key Ka0 (700) has been carried out on the target device which stores the Enc (Kc, Ka2) 707 as the input of the key conversion processing. By doing this, it is confirmed that the authentication processing for generating the authentication key Ka0 (700) has been carried out and that the target device which stores the Enc (Kc, Ka2) 707 is not an unauthorized device. Further, as indicated in the description of the key generation flag, it is confirmed, in the conditional branch 804, that the Ka2 (706) has been generated in the confidential information processing unit 102. By doing this, it is confirmed that the decryption is not carried out when the Ka2 (706) is not generated, in other words, under the conditions that Ka2=0, and the like.

By performing the above-described confirmations, it is confirmed that the key conversion processing which has been set by the host CPU 103 is carried out with authorization. Accordingly, after the confirmations, a conversion processing 805 (in FIG. 8, a processing of decryption with the Ka2 (706) and encryption with the Kh (709)) is carried out on the Enc (Kc, Ka2) as the input. During this period, an enable signal is outputted from the key conversion controller 216 to the circuits where the encryption processing 712 and the decryption processing 710 are performed. And, as a result of the conversion processing, the Enc (Kc, Kh) outputting 806 is carried out. After the outputting, the key conversion processing is completed.

As described above, through the processings of FIG. 8 and FIG. 9, the key conversion processing is carried out. Note that, in the example of FIG. 8, the description is given of the case in which the Enc (Kc, Kh) 708 is obtained by performing the key conversion processing on the Enc (Kc, Ka2) 707 in the state that {the Enc (Ka1, Ka0), the Enc (Ka2, Ka1) and the Enc (Kc, Ka2)} are stored in the target device. Accordingly, when generalizing this, it is also possible to have a configuration for obtaining Enc (Kai, Kh) by performing the key conversion processing on Enc (Kai, Ka (i−1)) where i is a natural number satisfying $1 \leq i \leq m$, and by using Kam for encrypting and decrypting content in a state where m keys {Enc (Ka1, Ka0), . . . , Enc (Kam, Ka (m−1))} (m is a natural number) are stored in the target device. In this case, it is possible to perform the key conversion processing similar to the one in FIG. 8, by using Ka (i−1) in a circuit for decryption and Kh in a circuit for encryption in the confidential information processing unit for performing the key conversion processing, and by using a flag indicating that Ka (i−1) is generated, instead, for the key conversion processing flags. Therefore, the key generation flag corresponding to Ka (i−1) is added in the confidential information processing unit and a circuit for selecting this flag is added to the key conversion controller.

Embodiment 4

Next, the embodiment 4 will be described. An explanation of the basic overall structure is omitted since it is similar to the one in FIG. 2.

Figure 10:
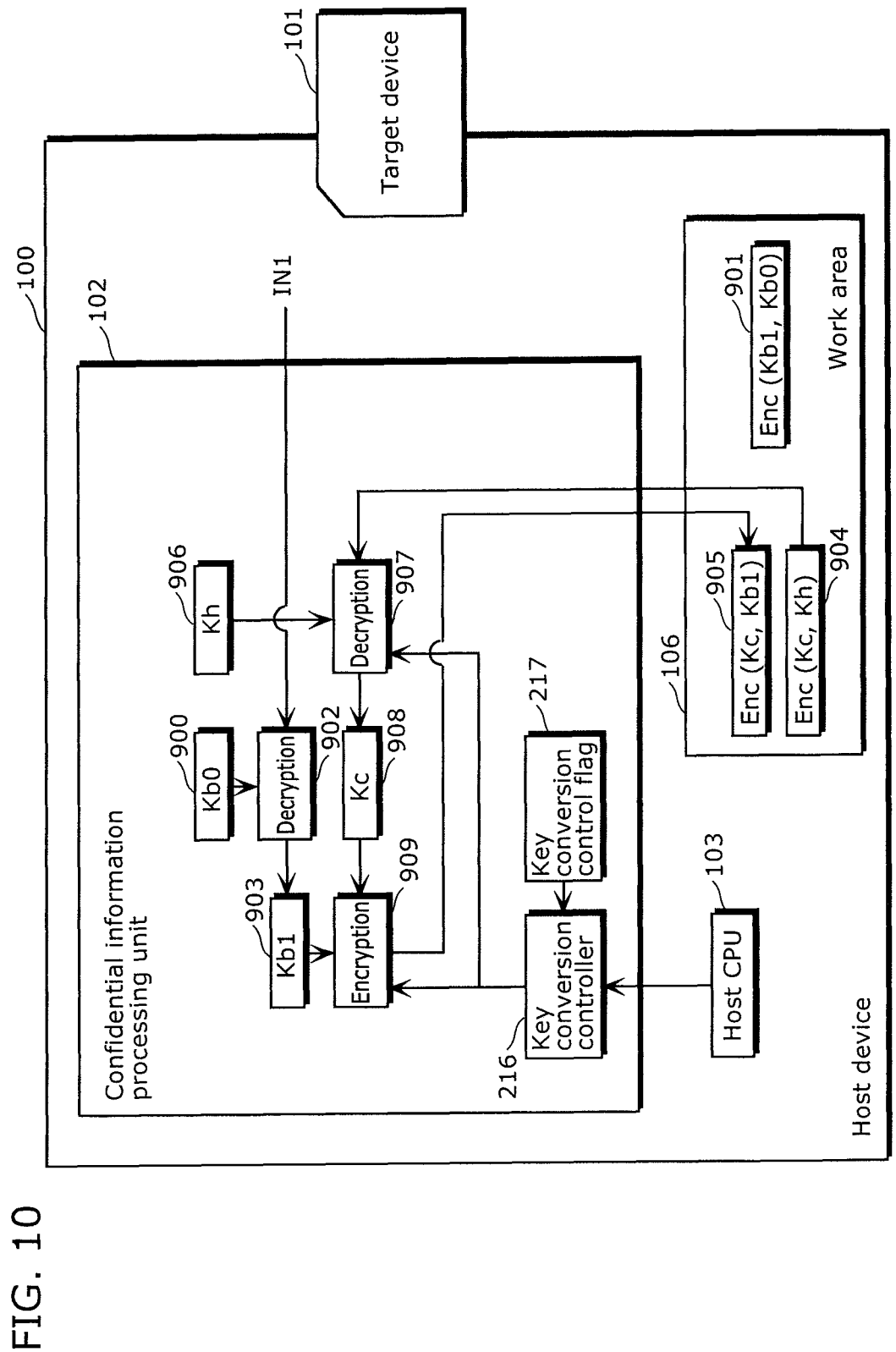
FIG. 10 is a diagram showing a structure for performing the key conversion processing by which the output Enc (Kc, Kb1) is obtained from the input Enc (Kc, Kh) in the present invention.

In the embodiment 4, a key conversion processing method in an embodiment of the present invention will be described. FIG. 10 shows one embodiment of the key conversion processing in the present invention. For the same elements as in the FIG. 2 and FIG. 3, the same numerals are applied. In FIG. 10, as an embodiment of the present invention, the following case is explained: the case where the Enc (Kc, Kb1) is obtained by performing the key conversion processing on the Enc (Kc, Kh) using the Kb1, with two encrypted keys {the Enc (Kb1, Kb0), the Enc (Kb2, Kb1)} stored in the target device 101. In addition, although the decryptions 902 and 907 are shown as if they are different decryption circuits in FIG. 10, this is intended to simplify the description along the sequence. In many cases, in fact, the same decryption circuit is used several times along the sequence. In this case, each of the keys used for decryption or generated as a result of decryption need to be stored in an area to which no access is available from outside. Further, in the case where algorithms for encryption and decryption are related to each other, it is possible to share part of, or all of the decryption and encryption circuit.

The Enc (Kc, Kh) is not stored in the target device here, but stored, for example, in a storage device such as a hard disk within the host device as in the case of the embodiment 3. Applications of this key conversion processing include the processing of re-storing KC, which is backed up in the host device, on the target device. In such a processing, since the backed-up Kc is stored as the Enc (Kc, Kh), only the host device which has the Kh, in other words which performed the backup, may decrypt the Enc (Kc, Kh).

Further, in FIG. 10, it is assumed that the authentication processing for the target device 101 is completed and the Kb0 (900) is generated in the confidential information processing unit 102. Also, it is assumed that the Enc (Kb1, Kb0) 901 stored in the target device 101 is temporarily held in the work area 106 and then inputted into the confidential information processing unit 102 as an IN1 so that the Kb1 (903) is generated by the decryption 902 using Kb0 (900). Note that the Enc (Kb1, Kb0) 901 does not necessarily have to be stored temporarily in the work area 106, but it may be inputted into the confidential information processing unit 102 directly from the target device 101.

It is also assumed that the Enc (Kc, Kh) 904 to be an input for the key conversion processing has been stored in the work area 106 from the storage device and the like of the host device 100, and the Enc (Kc, Kb1) 905 which is an output will be stored in the work area 106. After stored in the work area, it is stored, this time, in the target device 101. Note that the Enc (Kc, Kb1) which is the output does not necessarily have to be stored temporarily in the work area 106, but it may be outputted to the target device 101 directly from the confidential information processing unit 102.

An operation of the confidential information processing unit 102, when the key conversion processing using the Kh 906 and the Kb1 (903) is carried out, will be described below. In FIG. 10, a control sequence for performing the key conversion processing where the Enc (Kc, Kh) is converted into the Enc (Kc, Kb1) is defined in the confidential information processing unit 102. It is assumed that this control sequence is initiated by the host CPU 103.

In the key conversion processing, first, keys for encrypting and decrypting Kc (a Kh 906 stored in the confidential information processing unit 102 and a Kb1 (903) generated in the confidential information processing unit 102) are set in circuits for encryption and decryption. Then the Enc (Kc, Kh) 904 is inputted into the confidential information processing unit 102 and the decryption processing 907 is performed on the inputted key using the Kh (906). As described above, an unencrypted Kc 908 is generated in the confidential information processing unit 102 by the decryption using the Kh (906). Here, in the confidential information processing unit 102, this key is stored so as not to be accessed by the host CPU 103. As an example of this storing, the Kc 908 may be stored in a register which the host CPU 103 can not access. Note that the Kc 908 may be deleted by the confidential information processing unit 102 after the key conversion processing is completed. Then the encryption processing 909 is carried out on the Kc 908 using the Kb1 (903). By this encryption processing 909, the Enc (Kc, Kb1) 905 is outputted from the confidential information processing unit 102. By the above-described processing, the key conversion processing is completed.

Further, similarly to the case in the embodiment 1, the encryption processing 909 and the decryption processing 907 in the key conversion processing are controlled by a key conversion controller 216 and a key conversion control flag 217 shown in FIG. 10. Here, flags which are required in the case of FIG. 10 will be considered. In the processing of FIG. 10, the Kb1 (903) which is generated from the authentication key Kb0 (900) is used. Therefore, the authentication processing for generating the authentication key Kb0 (900) needs to be completed. For that reason, the authentication flag (kb0) is required as one of the key conversion control flag 217. Note that, in the case of FIG. 10, the same target flag is not required because the Enc (Kc, Kh) 904 which is the input for the key conversion processing and the Enc (Kc, Kb1) 905 which is the output do not have to be stored in the same target device. Further, in this key conversion processing, the Kb1 (903) needs to be generated in the confidential information processing unit 102 by the decryption processing. For that reason, the key generation flag (Kb1) is required as one of the key conversion control flag 217. Note that, a generation flag for the Kh 906 is not required because it is a key stored in advance in the host device 100. Therefore, in the case where the key conversion processing setting for performing the key conversion processing shown by FIG. 10 is carried out by the host CPU 103, the output of the AND gate which has two flags including the authentication flag (Kb0) and the key generation flag (Kb1) as inputs is selected as the output of the selector 301 shown in FIG. 4. Consequently, only when both of these two flags are set to 1, the encryption circuit is allowed to be used.

Next, with reference to the flowchart of FIG. 11, the processing flow of the key conversion processing shown in FIG. 10 will be described below. In the key conversion processing of the present invention, as described also in the embodiment 1, firstly an execution of the key-conversion-processing setting 1000 is instructed by the host CPU 103. By doing this, the key conversion processing is initiated to be executed in the confidential information processing unit 102. Next, an execution of a reading of the key conversion control flag 1001 is instructed to the key conversion controller 217. After the reading, an Enc (Kc, Kh) inputting 1002 is carried out to the confidential information processing unit 102. After that, it is confirmed, based on the flags which have been read, whether or not the conditions for preventing unauthorized processings are satisfied in the confidential information processing unit 102. These processings for the confirmation correspond to the conditional branches 1003 and 1004 in FIG. 11. Note that, when it is confirmed that unauthorized processings are not to be carried out, the order of performing the confirmation does not have to be the same as the one shown in FIG. 11.

Figure 11:
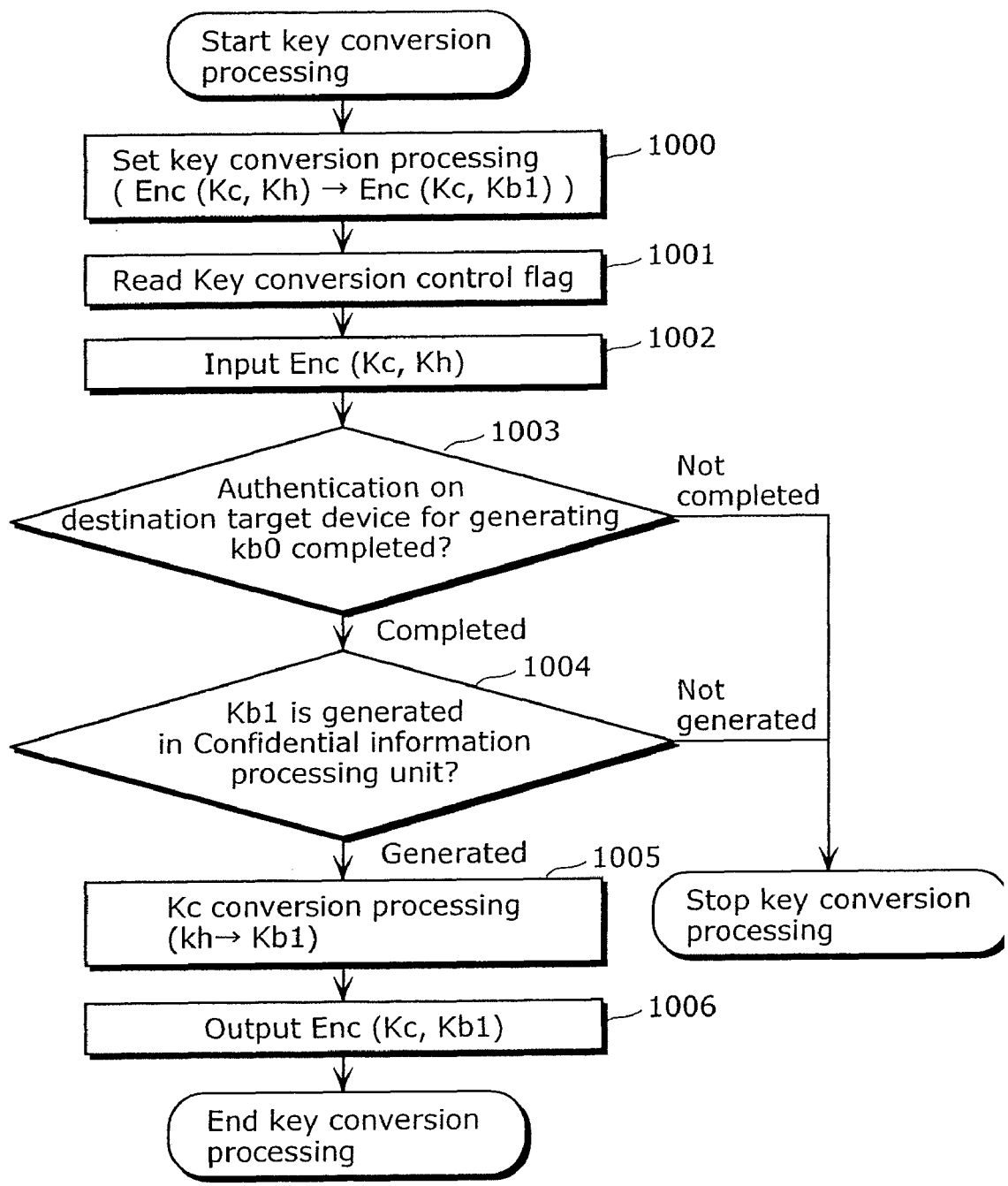
FIG. 11 is a flowchart showing how the key conversion processing for obtaining the output Enc (Kc, Kb1) from the input Enc (Kc, Kh) is carried out in the present invention.

In FIG. 11, two kinds of confirmations are carried out as indicated in the description of the key conversion control flag in FIG. 10. First, as a condition for the authentication of the target device, it is confirmed, in the conditional branch 1003, whether or not the authentication processing for generating the authentication key Kb0 (900) has been carried out on the target device which stores the Enc (Kc, Kb1) 905 as the output of the key conversion processing. By doing this, it is confirmed that the authentication processing for generating the authentication key Kb0 (900) has been carried out and that the target device which stores the Enc (Kc, Kb1) 905 is not an unauthorized device. Further, as shown in the description for the key generation flag, it is confirmed in the conditional branch 1004 that the Kb1 (903) has been generated in the confidential information processing unit 102. By doing this, it is confirmed that the encryption is not carried out when the Kb1 (903) has not been generated, in other words, in a state in which Kb1=0 and the like.

By performing the above-described confirmations, it is confirmed that the key conversion processing which is set by the host CPU 103 is carried out with authorization. Therefore, after the confirmations, a conversion processing 1005 (in FIG. 10, a processing of decryption by the Kh (906) and encryption by the Kb1 (903)) is carried out on the Enc (Kc, Kh) as the input. During this period, an enable signal is outputted from the key conversion controller 216 to the circuits where the encryption processing 909 and the decryption processing 907 are performed. And, as a result of the conversion processing, the Enc (Kc, Kb1) outputting 1006 is carried out. After the outputting, the key conversion processing is completed.

As described above, through the processings of FIG. 10 and FIG. 11, the key conversion processing is carried out. Note that, in the embodiment of FIG. 10, the description is given of the case in which the Enc (Kc, Kb1) 905 is obtained by performing the key conversion processing on the Enc (Kc, Kh) 904 in the state that {the Enc (Kb1, Kb0), the Enc (Kb2, Kb1)} are stored in the target device. Accordingly, when generalizing this, it is also possible to have a configuration for obtaining Enc (Kbj, Kb (j−1)) by performing the key conversion processing on Enc (Kbj, Kh) where j is a natural number satisfying $1 \leq j \leq n$, and by using Kbn for encrypting and decrypting content in a state where n keys {Enc (Kb1, Kb0), . . . , Enc (Kbn, Kb (n−1))} (n is a natural number) are stored in the target device. In this case, it is possible to perform the key conversion processing similar to the one in FIG. 10, by using Kh in a circuit for decryption and Kb (j−1) in a circuit for encryption in the confidential information processing unit, and by using a flag indicating that Kb (j−1) is generated, instead, for the key conversion processing flag. Therefore, the key generation flag corresponding to Kb (j−1) is added in the confidential information processing unit and a circuit for selecting this flag is added to the key conversion controller.

Embodiment 5

Next, the embodiment 5 will be described. An explanation of the basic overall structure is omitted since it is similar to the one in FIG. 2.

Figure 12:
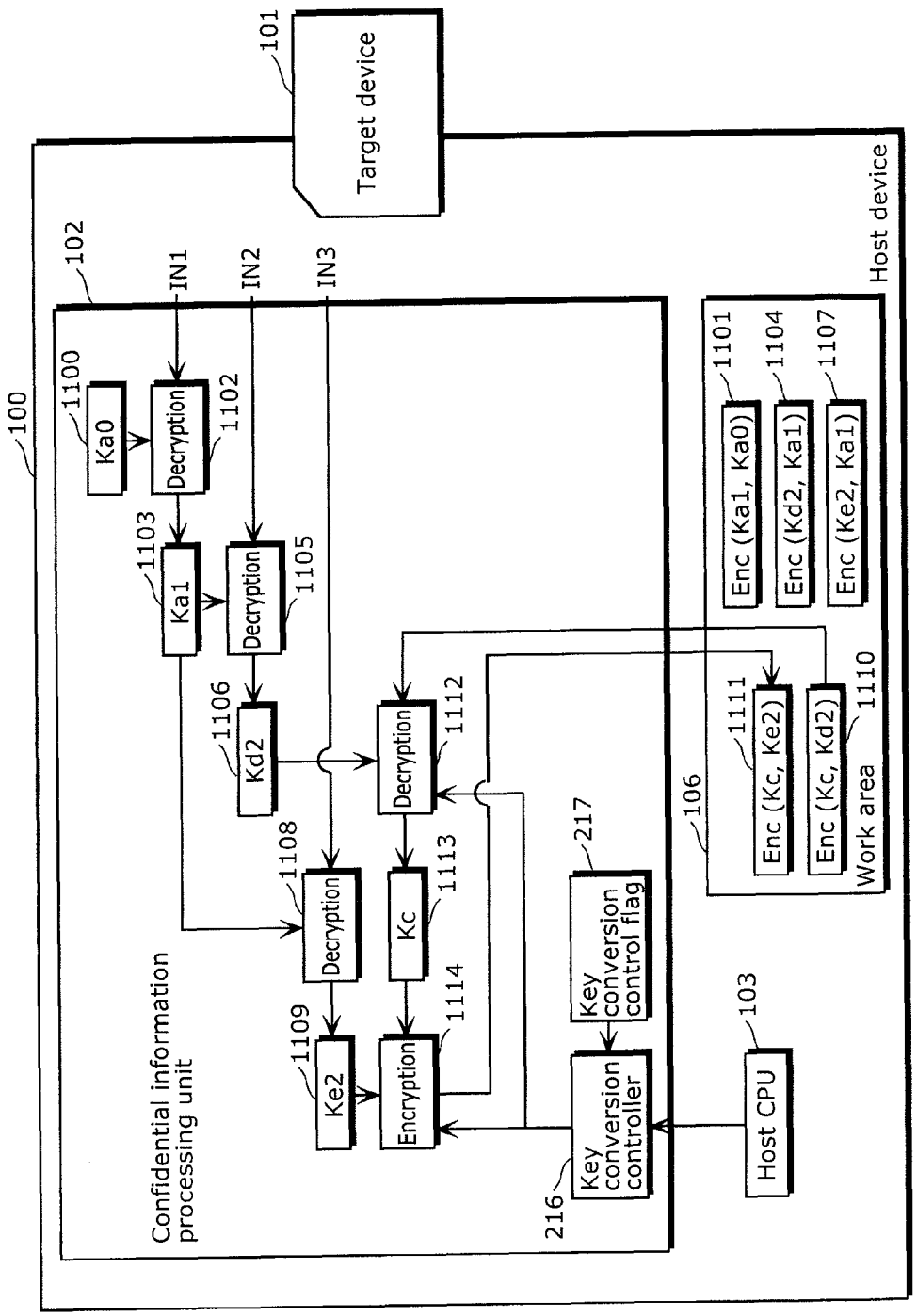
FIG. 12 is a diagram showing a structure for performing the key conversion processing by which the output Enc (Kc, Kd2) is obtained from the input Enc (Kc, Ka2) in the present invention.

In the embodiment 5, a key conversion processing method in an embodiment of the present invention will be described. FIG. 12 shows an embodiment of the key conversion processing in the present invention. For the same elements as in the FIG. 2 and FIG. 3, the same numerals are applied. In FIG. 12, as an embodiment of the present invention, the following case is explained: the case where an encrypted key Enc (Ka1, Ka0) is stored in the target device 101, and two encrypted keys {an Enc (Kd2, Ka1) and an Enc (Ke2, Ka1)} which are encrypted with a Ka1 are stored in the same target device, and further, keys an Enc (Kc, Kd2) and an Enc (Ke3, Ke2) encrypted with the Kd2 and the Ke2, respectively, are stored; and the case where an Enc (Kc, Ke2) is obtained by performing the key conversion processing on an Enc (Kc, Kd2) by a Ke2. As described above, in the embodiment 5, the key conversion processing between keys generated by the same authentication key Ka0 will be described. In addition, although the decryptions 1102, 1105, 1108 and 1112 are shown as if they are different decryption circuits in FIG. 12, this is intended to simplify the description along the sequence. In many cases, in fact, the same decryption circuit is used several times along the sequence. In this case, each of the keys used for decryption or generated as a result of decryption should be stored in an area to which no access is available from outside. Further, in the case where algorithms for encryption and decryption are related to each other, it is possible to share part of, or all of the decryption and encryption circuit.

As for an application of this key conversion processing, since the key for encrypting the Kc is changed from the Kd2 to the Ke2, it may be used for the purpose of decreasing the number of keys for encrypting the Kc, by making the Kd2 unnecessary, and by deleting the unnecessary kd2 from the target device.

Further, In FIG. 12, it is assumed that the authentication processing on the target device 101 has been completed and the authentication key Ka0 (1100) has been generated. It is also assumed that the Enc (Ka1, Ka0) 1101 stored in the target device 101 is temporarily held in the work area 106 and then inputted into the confidential information processing unit 102 as an IN1 so that a Ka1 (1103) is generated by the decryption 1102 using the authentication key Ka0 (1100). Further, it is assumed that the Enc (Kd2, Ka1) 1104 stored in the target device 101 is temporarily held in the work area 106 and then inputted into the confidential information processing unit 102 as an IN2 so that the Kd2 (1106) is generated by the decryption 1105 using the Ka1 (1103). It is further assumed that the Enc (Ke2, Ka1) 1107 stored in the target device 101 is temporarily held in the work area 106 and then inputted into the confidential information processing unit 102 as an IN3 so that a Ke2 (1109) is generated by the decryption 1108 using the Ka1 (1103). Note that the Enc (Ka1, Ka0) 1101, the Enc (Kd2, Ka1) 1104 and the Enc (Ke2, Ka1) 1107 do not necessarily have to be temporarily stored in the work area 106, but they may be inputted into the confidential information processing unit 102 directly from the target device 101.

It is also assumed that the Enc (Kc, Kd2) 1110 to be an input for the key conversion processing has been stored in the work area 106 of the host device 100 from the target device 101 after the authentication processing, and the Enc (Kc, Ke2) 1111 which is an output will be stored in the work area 106. After stored in the work area, it is stored, this time, in the target device 101. Note that the Enc (Kc, Kd2) and the Enc (Kc, Ke2) do not necessarily have to be stored temporarily in the work area 106, but they may be inputted into the confidential information processing unit 102 directly from the target device 101, or outputted to the target device 101 directly from the confidential information processing unit 102.

An operation of the confidential information processing unit 102 when the key conversion processing using the Kd2 (1106) and the Ke2 (1109) is carried out will be described below. In FIG. 12, a control sequence for performing the key conversion processing where the Enc (Kc, Kd2) is converted into the Enc (Kc, Ke2) is defined in the confidential information processing unit 102. It is assumed that this control sequence is initiated by the host CPU 103.

In the key conversion processing, first, keys for encrypting and decrypting the Kc (the Kd2 (1106) and the Ke2 (1109) generated in the confidential information processing unit) are set in circuits for encryption and decryption. Then the Enc (Kc, Kd2) 1110 is inputted into the confidential information processing unit 102 and a decryption processing 1112 is performed on the inputted key using the Kd2 (1106). As described above, an unencrypted Kc 1113 is generated in the confidential information processing unit 102 by the decryption using the Kd2 (1106). Here, in the confidential information processing unit 102, this key is stored so as not to be accessed by the host CPU 103. As an example of this storing, the Kc 1113 may be stored in a register to which the host CPU 103 can not access. Note that the Kc 1113 may be deleted by the confidential information processing unit 102 after the key conversion processing is completed. Then an encryption processing 1114 is carried out on the Kc 1113 by using the Ke2 (1109). By the encryption processing 1114, the Enc (Kc, Ke2) 1111 is outputted from the confidential information processing unit 102. By the above-described processing, the key conversion processing is completed.

Further, as in the case of the embodiment 1, the encryption processing 1114 and the decryption processing 1112 in the key conversion processing are controlled by a key conversion controller 216 and a key conversion control flag 217 shown in FIG. 12. Here, flags which are required in the case of FIG. 12 will be explained. In the processing in FIG. 12, the Kd2 (1106) and the ke2 (1109) which are generated by the authentication key Ka0 (1100) are used. Therefore, it is necessary that the authentication processing for generating the authentication key Ka0 (1100) is completed. For that reason, the authentication flag (ka0) is required as one of the key conversion control flags 217. Note that, in the case of FIG. 12, the same target flag is not required because the authentication processing is performed only for generating the authentication key Ka0 (1100). Further, in this key conversion processing, the Kd2 (1106) and the Ke2 (1109) have to be generated in the confidential information processing unit 102 by the decryption processing. For that reason, the key generation flag (Kd2) and the key generation flag (Ke2) have to be included in the key conversion control flag 217. Therefore, in the case where the key conversion processing setting for performing the key conversion processing shown in FIG. 12 is instructed to be carried out by the host CPU 103, the output of the AND gate which has three flags including the authentication flag (Ka0), the key generation flag (Kd2) and the key generation flag (Ke2) as inputs is selected as the output of the selector 301 shown in FIG. 4. Consequently, only when all of these three flags indicate 1, the encryption circuit is allowed to be used.

Next, with reference to the flowchart of FIG. 13, the processing flow of the key conversion processing shown in FIG. 12 will be described below. In the key conversion processing of the present invention, as described also in the embodiment 1, firstly an execution of the key-conversion-processing setting 1200 is instructed by the host CPU 103. By doing this, the key conversion processing is initiated to be executed in the confidential information processing unit 102. Next, a reading of the key conversion control flag 1201 is carried out on the key conversion controller 217. After the reading, an inputting of the Enc (Kc, Kd2) 1202 into the confidential information processing unit 102 is carried out. Subsequently, it is confirmed, based on the flags which have been read, whether or not the conditions for preventing unauthorized processings are satisfied in the confidential information processing unit 102. These processings for the confirmation correspond to the conditional branches 1203 to 1205 in FIG. 13. Note that, when it is confirmed that unauthorized processings are not to be carried out, the order of performing the confirmation does not have to be the same as the one shown in FIG. 13.

In FIG. 13, three kinds of confirmations are carried out as indicated in the description of the key conversion control flag in FIG. 12. First, as a condition for the authentication of the target device, it is confirmed, in the conditional branch 1203, whether or not the authentication processing for generating the authentication key Ka0 (1100) has been carried out on the target device which stores the Enc (Kc, Kd2) 1110 as the input of the key conversion processing and the Enc (Kc, Ke2) 1111 as the output. By doing this, it is confirmed that the authentication processing for generating the authentication key Ka0 (1100) has been conducted and that the target device which stores the Enc (Kc, Kd2) 1110 and the Enc (Kc, Ke2) 1111 is not an unauthorized device. Further, as indicated in the description of the key generation flag, it is confirmed, in the conditional branches 1204 and 1205, that the Kd2 (1106) and the Ke2 (1109) have been generated in the confidential information processing unit 102. By doing this, it is confirmed that the decryption and the encryption are not carried out when the Kd2 (1106) and the Ke2 (1109) are not generated, in other words, in a state in which Kd2=0 and Ke2=0.

By performing the above-described confirmations, it is confirmed that the key conversion processing which is set by the host CPU 103 are carried out with authorization. Accordingly, after the confirmation, a conversion processing 1206

(in FIG. 12, the processing of decryption by the Kd2 (1106) and encryption by the Ke2 (1109)) for the Enc (Kc, Kd2) which is the input is carried out. During this period, an enable signal is outputted from the key conversion controller 216 to the circuits where the encryption processing 1114 and the decryption processing 1112 are performed. And, by the execution of the conversion processing, the Enc (Kc, Ke2) outputting 1207 is carried out. After the outputting, the key conversion processing is completed.

As described above, through the processings of FIG. 12 and FIG. 13, the key conversion processing is carried out. Note that, in the embodiment of FIG. 12, it is also possible to have the configuration for obtaining the Enc (Kc, Ke2) 1111 by performing the key conversion processing on the Enc (Kc, Kd2) 1110 in the state that the Enc (Ka1, Ka0), {the Enc (Kd2, Ka1), the Enc (Kc, Kd2)} and {the Enc (Ke2, Ka1), the Enc (Ke3, Ke2)} are stored in the target device. Accordingly, when generalizing this, it is also possible to have a configuration for obtaining Enc (Kdi, Ke (i−1)) by performing the key conversion processing on Enc (Kdi, Kd (i−1)) where i is a natural number satisfying $1 \leq i \leq t$, and by using Kdt and Ket for encrypting and decrypting content in a state where s keys {Enc (Ka1, Ka0), . . . , Enc (Kas, Ka (s−1))} (s is a natural number) are stored, and t keys {Enc (Kd1, Kas), Enc (Kd2, Kd1). . . , Enc (Kdt, Kd (t−1))} and {Enc (Ke1, Kas), Enc (Ke2, Ke1). . . , Enc (Ket, Ke (t−1))} are stored, in the target device. In this case, it is possible to perform the key conversion processing as in FIG. 12, by using Kd (i−1) in a circuit for decryption and Ke (i−1) in a circuit for encryption in the confidential information processing unit for performing the key conversion processing, and by using a flag indicating that Kd (i−1) is generated and a flag indicating that ke (i−1) is generated, instead, for the key conversion processing flags. Therefore, the key generation flag corresponding to Kd (i−1) and Ke (i−1) is added in the confidential information processing unit, and a circuit for the selecting this flag is added to the key conversion controller.

INDUSTRIAL APPLICABILITY

According to the present invention, it is possible to perform a key conversion processing between different confidential information processing methods. In performing it, it is also possible to carry out the processing without leakage of key information and without unauthorized processing. Consequently, it is possible to be used in a confidential information system using the target device implementing the plural confidential information processing methods.

The invention claimed is:

1. A host device for processing confidential information, which reads an encrypted content from a target device storing encrypted confidential information that includes the encrypted content, and decrypts the encrypted content for use, the host device comprising:
a confidential information processor performing operations according only to a plurality of predetermined sequences;
a Central Processing Unit (CPU) which directs said confidential information processor to initiate the sequences;
a first interface which inputs and outputs data including the confidential information between said confidential information processor and the target device; and
a second interface which inputs and outputs data including the confidential information between said confidential information processor and said CPU,
wherein: m+1 keys {K0, K1, . . . , Km} are stored, as the encrypted confidential information, in the target device or said host device;
n keys {Kb1, . . . , Kbn} are stored in the target device or a different target device, n being a natural number;
the key Km is a content key for encrypting a content;
the key Ki is encrypted with a key K (i−1), i being a natural number satisfying $1 \leq i \leq m$;
the sequences include a key conversion sequence which converts a Ki encrypted with a K (i−1) into a Ki encrypted with a key different from the K (i−1), the to-be-converted encrypted Ki being a key of the encrypted m+1 keys;
said host device further performs an authentication processing for the target device or the different target device;
a key Kb0 is an authentication key generated by the authentication processing;
the different key is a key of the keys {Kb0, . . . , Kb (n−1)}; and
said first interface and said second interface output the confidential information outside said confidential information processor, only when the confidential information is encrypted, after the key conversion sequence is initiated.

2. The host device for processing confidential information according to claim 1,
wherein: said host device performs a first authentication processing for the target device;
a key K0 for encrypting the key K1 is an authentication key Ka0 generated by the first authentication processing; and
the key Kbj is encrypted with a Kb (j−1), j being a natural number satisfying $1 \leq j \leq n$.

3. The host device for processing confidential information according to claim 2, wherein the different key is Kb (n−m+1).

4. The host device for processing confidential information according to claim 2,
wherein: said confidential information processor further includes a flag storage storing an authentication flag which indicates whether or not the first authentication processing has been properly completed; and
when said authentication flag does not indicate a proper completion of the first authentication processing, the key conversion sequence is prohibited from being initiated by said host CPU.

5. The host device for processing confidential information according to claim 4,
wherein: said confidential information processor further includes a flag storage storing a key generation flag which indicates whether or not the key K (i−1) is generated inside; and
when said key generation flag does not indicate that the key K (i−1) has been generated inside, the key conversion sequence is prohibited from being initiated by said host CPU.

6. The host device for processing confidential information according to claim 4,
wherein said confidential information processor is further configured to initialize said flag which is stored in said flag storage, when a connection to the target device is disconnected.

7. The host device for processing confidential information according to claim 2,
wherein: said confidential information processor further includes a flag storage storing an authentication flag which indicates whether or not the authentication processing has been properly completed; and when said authentication flag does not indicate a proper completion of the authentication processing, the key conversion sequence is prohibited from being initiated by said host CPU.

8. The host device for processing confidential information according to claim 7,
wherein: said confidential information processor further includes a flag storage storing a key generation flag which indicates whether or not the different key has been generated inside; and when said key generation flag does not indicate that the different key is generated inside, the key conversion sequence is prohibited from being initiated by said host CPU.

9. The host device for processing confidential information according to claim 2,
wherein: said confidential information processor further includes a flag storage storing a target flag which indicates whether or not the first authentication processing and the authentication processing have been performed on the same target device; and when said target flag does not indicate the first authentication processing and the authentication processing have been performed on the same target device, the key conversion sequence is prohibited from being initiated by said host CPU.

10. The host device for processing confidential information according to claim 1,
wherein said host device is further configured to delete a key which is decrypted and held by said confidential information when a connection to the target device is disconnected.

11. The host device for processing confidential information according to claim 1,
wherein said host device is mounted as a single semiconductor device.

12. The A host device for processing confidential information, which reads an encrypted content from a target device storing encrypted confidential information that includes the encrypted content, and decrypts the encrypted content for use, the host device comprising:
a confidential information processor performing operations according only to a plurality of predetermined sequences;
a Central Processing Unit (CPU) which directs said confidential information processor to initiate the sequences;
a first interface which inputs and outputs data including the confidential information between said confidential information processor and the target device; and
a second interface which inputs and outputs data including the confidential information between said confidential information processor and said CPU,
wherein: m+1 keys {K0, K1, ..., Km} are stored, as the encrypted confidential information, in the target device or said host device;
the key Km is a content key for encrypting a content;
the key Ki is encrypted with a key K (i−1), i being a natural number satisfying 1≦i≦m;
the sequences include a key conversion sequence which converts a Ki encrypted with a K (i−1) into a Ki encrypted with a key different from the K (i−1), the to-be-converted encrypted Ki being a key of the encrypted m+1 keys;
said first interface and said second interface output the confidential information outside said confidential information processor, only when the confidential information is encrypted, after the key conversion sequence is initiated;
said host device performs a first authentication processing for the target device;
the Key K0 for encrypting the key K1 is an authentication key Ka0 generated by the first authentication processing; and
the different key is a host key Kh which is stored in the confidential information processor.

13. The host device for processing confidential information according to claim 1,
wherein: the Key K0 is a host key Kh stored in the confidential information processor;
the n keys {Kb1, Kbn} are stored in the target device,
the key Kbj is encrypted with the key Kb (j−1), j being a natural number satisfying 1≦j≦n; and
in the key conversion sequence, a key K1 encrypted with the host key Kh is converted into a K1 encrypted with a key of the keys {Kb0, ..., Kb (n−1)}.

14. A host device for processing confidential information, which reads an encrypted content from a target device storing encrypted confidential information that includes the encrypted content, and decrypts the encrypted content for use, the host device comprising:
a confidential information processor performing operations according only to a plurality of predetermined sequences;
a Central Processing Unit (CPU) which directs said confidential information processor to initiate the sequences;
a first interface which inputs and outputs data including the confidential information between said confidential information processor and the target device; and
a second interface which inputs and outputs data including the confidential information between said confidential information processor and said CPU,
wherein: m+1 keys {K0, K1, ..., Km} are stored, as the encrypted confidential information, in the target device or said host device;
the key Km is a content key for encrypting a content;
the key Ki is encrypted with a key K (i−1), i being a natural number satisfying 1≦i≦m;
the sequences include a key conversion sequence which converts a Ki encrypted with a K (i−1) into a Ki encrypted with a key different from the K (i−1), the to-be-converted encrypted Ki being a key of the encrypted m+1 keys;
said first interface and said second interface output the confidential information outside said confidential information processor, only when the confidential information is encrypted, after the key conversion sequence is initiated;
said host device performing a first authentication processing for the target device;
the key K0, for encrypting the key K1 is an authentication key Ka0 generated by the first authentication processing;
(m−s) keys {Ke1, ..., Ke (m−s)} are stored in the target device;
a key Kej is encrypted with a key Ke (j−1), j being a natural number satisfying 1≦j≦m−s;
a key Ke0 is a key Ks which is a key among the m keys {K1, ..., Km}, s being a natural number satisfying 1≦s≦m; and
the different key is a key of the keys {Ke1, ..., Ke (m−s−1)}.

15. A method of processing confidential information, for use in a host device for processing confidential information, which reads an encrypted content from a target device storing encrypted confidential information that includes the encrypted content, and decrypts the encrypted content for use,
the host device having:
a confidential information processor which performs operations according only to a plurality of predetermined sequences;
a Central Processing Unit (CPU);
a first interface which inputs and outputs data including the confidential information between the confidential information processor and the target device; and
a second interface which inputs and outputs data including the confidential information between the confidential information processor and the CPU,
wherein the target device or the host device stores m+1 keys $\{K0, K1, \ldots, Km\}$ as the encrypted confidential information, the key Km being a content key for encrypting content, and
n keys $\{Kb1, \ldots, Kbn\}$ are stored in the target device or a different target device, n being a natural number,
the method for processing confidential information comprising:
directing, by the Central Processing Unit (CPU), the confidential information processor to initiate the sequences;
initiating, by the confidential information processor, operations according to the sequences;
encrypting the key Ki with a key K (i−1), i being a natural number satisfying $1 \leq i \leq m$;
performing, by the host device, an authentication processing for the target device or the different target device;
setting a key Kb0 as an authentication key generated by the authentication processing;
performing a key conversion sequence, of the sequences, which converts a Ki encrypted with a K (i−1) into a Ki encrypted with a key different from the K (i−1), the to-be-converted encrypted Ki being a key of the encrypted m+1 keys;
setting the different key as a key of the keys $\{Kb0, \ldots, Kb (n-1)\}$; and
outputting only the encrypted confidential information outside the confidential information processor using the first interface and the second interface only when the confidential information is encrypted, after the key conversion sequence is initiated.

16. The host device for processing confidential information according to claim 15, further comprising
performing, by the host device, a first authentication processing for the target device;
setting a key K0 for encrypting the key K1 as an authentication key Ka0 generated by the first authentication processing;
encrypted the Kbj with a Kb (j−1), j being a natural number satisfying $1 \leq j \leq n$.

17. The method of processing confidential information according to claim 16,
wherein the different key is Kb (n−m+1).

18. The method of processing confidential information according to claim 15, wherein the n keys $\{Kb1, \ldots, Kbn\}$ are stored in the target device,
the method further comprising:
setting the Key K0 as a host key Kh stored in the confidential information processor;
encrypting the key Kbj with the key Kb (j−1), j being a natural number satisfying $1 \leq j \leq n$; and
in the key conversion sequence, converting a key K1 encrypted with the host key Kh into a K1 encrypted with a key of the keys $\{Kb0, \ldots, Kb (n-1)\}$.

19. The A method of processing confidential information, for use in a host device for processing confidential information, which reads an encrypted content from a target device storing encrypted confidential information that includes the encrypted content, and decrypts the encrypted content for use,
the host device having:
a confidential information processor which performs operations according only to a plurality of predetermined sequences;
a Central Processing Unit (CPU);
a first interface which inputs and outputs data including the confidential information between the confidential information processor and the target device; and
a second interface which inputs and outputs data including the confidential information between the confidential information processor and the CPU,
wherein the target device or the host device stores m+1 keys $\{K0, K1, \ldots, Km\}$ as the encrypted confidential information, the key Km being a content key for encrypting content,
the method for processing confidential information comprising:
directing, by the Central Processing Unit (CPU), the confidential information processor to initiate the sequences;
initiating, by the confidential information processor, operations according to the sequences;
encrypting the key Ki with a key K (i−1), i being a natural number satisfying $1 \leq i \leq m$;
performing a key conversion sequence, of the sequences, which converts a Ki encrypted with a K (i−1) into a Ki encrypted with a key different from the K (i−1), the to-be-converted encrypted Ki being a key of the encrypted m+1 keys;
outputting the confidential information outside the confidential information processor using the first interface and the second interface only when the confidential information is encrypted, after the key conversion sequence is initiated;
performing, by the host device, a first authentication processing for the target device;
setting the Key K0 for encrypting the key K1 as an authentication key Ka0 generated by the first authentication processing; and
setting the different key is as a host key Kh which is stored in the confidential information processor.

20. A method of processing confidential information, for use in a host device for processing confidential information, which reads an encrypted content from a target device storing encrypted confidential information that includes the encrypted content, and decrypts the encrypted content for use,
the host device having:
a confidential information processor which performs operations according only to a plurality of predetermined sequences;
a Central Processing Unit (CPU);
a first interface which inputs and outputs data including the confidential information between the confidential information processor and the target device; and a second interface which inputs and outputs data including the confidential information between the confidential information processor and the CPU, wherein the target device or the host device stores m+1 keys {K0, K1, ..., Km} as the encrypted confidential information, the key Km being a content key for encrypting content, and the target device stores (m−s) keys {Ke1, ..., Ke (m−s)}, s being a natural number satisfying $1 \leq s \leq m$;

the method for processing confidential information comprising:

directing, by the Central Processing Unit (CPU), the confidential information processor to initiate the sequences;

initiating, by the confidential information processor, operations according to the sequences;

encrypting the key Ki with a key K (i−1), i being a natural number satisfying $1 \leq i \leq m$;

performing a key conversion sequence, of the sequences, which converts a Ki encrypted with a K (i−1) into a Ki encrypted with a key different from the K (i−1), the to-be-converted encrypted Ki being a key of the encrypted m+1 keys;

performing, by the host device, a first authentication processing for the target device;

setting the key K0, for encrypting the key K1 as an authentication key Ka0 generated by the first authentication processing;

encrypting a key Kej with a key Ke (j−1), j being a natural number satisfying $1 \leq j \leq m-s$;

setting a key Ke0 as a key Ks which is a key of the m keys {K1, ..., Km};

setting the different key is as a key of the keys {Ke1, ..., Ke (m−s−1)}; and outputting the confidential information outside the confidential information processor using the first interface and the second interface only when the confidential information is encrypted, after the key conversion sequence is initiated.

\* \* \* \* \*

UNITED STATES PATENT AND TRADEMARK OFFICE
CERTIFICATE OF CORRECTION

| | | |
|---|---|---|
| PATENT NO. | : 8,024,583 B2 | |
| APPLICATION NO. | : 11/912422 | |
| DATED | : September 20, 2011 | |
| INVENTOR(S) | : Kazuya Shimizu et al. | |

It is certified that error appears in the above-identified patent and that said Letters Patent is hereby corrected as shown below:

At column (29), line 50, "The host device for processing" should be --The method of processing--.

Signed and Sealed this
Thirteenth Day of December, 2011

David J. Kappos
*Director of the United States Patent and Trademark Office*